US012200805B2

(12) United States Patent
Damnjanovic et al.

(10) Patent No.: US 12,200,805 B2
(45) Date of Patent: Jan. 14, 2025

(54) USER EQUIPMENT RELAY PROCEDURE

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US); Juan Montojo, San Diego, CA (US); Olufunmilola Omolade Awoniyi-Oteri, San Diego, CA (US); Iyab Issam Sakhnini, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 18/182,988

(22) Filed: Mar. 13, 2023

(65) Prior Publication Data

US 2023/0217535 A1 Jul. 6, 2023

Related U.S. Application Data

(63) Continuation of application No. 17/196,912, filed on Mar. 9, 2021, now Pat. No. 11,622,409.

(60) Provisional application No. 62/987,834, filed on Mar. 10, 2020.

(51) Int. Cl.
| | |
|---|---|
| *H04W 76/27* | (2018.01) |
| *H04W 8/00* | (2009.01) |
| *H04W 24/10* | (2009.01) |
| *H04W 76/14* | (2018.01) |
| *H04W 88/04* | (2009.01) |

(52) U.S. Cl.
CPC .......... *H04W 76/27* (2018.02); *H04W 8/005* (2013.01); *H04W 24/10* (2013.01); *H04W 76/14* (2018.02); *H04W 88/04* (2013.01)

(58) Field of Classification Search
CPC ..... H04W 76/27; H04W 76/14; H04W 8/005; H04W 24/10; H04W 88/04
USPC ........................................................ 370/315
See application file for complete search history.

(56) References Cited

U.S. PATENT DOCUMENTS

| | | | |
|---|---|---|---|
| 10,986,690 B2 | 4/2021 | Lee et al. | |
| 11,109,434 B2 | 8/2021 | Lee et al. | |
| 11,399,411 B2 | 7/2022 | Xu et al. | |
| 2017/0295531 A1* | 10/2017 | Singh .................. | H04W 36/302 |

(Continued)

FOREIGN PATENT DOCUMENTS

| | | | | |
|---|---|---|---|---|
| CN | 106888494 A | 6/2017 | | |
| WO | WO-2016181095 A1 * | 11/2016 | ............ | H04W 72/04 |

*Primary Examiner* — Mong-Thuy T Tran
(74) *Attorney, Agent, or Firm* — Procopio, Cory, Hargreaves & Savitch LLP/Qualcomm Incorporated

(57) ABSTRACT

Aspects presented herein may enable a remote UE to notify a base station about the availability of a relay UE that is not connected to the base station. In one aspect, a remote UE transmits, to a relay UE, a relay request via sidelink, the relay UE being in an RRC inactive mode. The remote UE receives, from the relay UE via the sidelink, an indication of relay availability in response to the relay request. The remote UE receives, from a base station, a configuration for relay of communication from the base station over the sidelink between the remote UE and the relay UE. The remote UE transmits or receives user data from the base station through the relay UE based on the configuration.

30 Claims, 15 Drawing Sheets

(56) References Cited

U.S. PATENT DOCUMENTS

| | | |
|---|---|---|
| 2017/0295598 A1 | 10/2017 | Hampel et al. |
| 2018/0084480 A1 | 3/2018 | Yasukawa et al. |
| 2018/0092027 A1 | 3/2018 | Sheng |
| 2018/0199390 A1* | 7/2018 | Hahn ................... H04B 7/2606 |
| 2018/0213588 A1 | 7/2018 | Wei et al. |
| 2019/0239147 A1 | 8/2019 | Chun et al. |
| 2019/0357177 A1 | 11/2019 | Kuang et al. |
| 2020/0015192 A1 | 1/2020 | Chun |
| 2020/0053524 A1 | 2/2020 | Novlan et al. |
| 2020/0092685 A1 | 3/2020 | Fehrenbach et al. |
| 2020/0163005 A1 | 5/2020 | Rao et al. |
| 2020/0314728 A1 | 10/2020 | Reimann et al. |
| 2020/0351965 A1 | 11/2020 | Ugurlu et al. |
| 2021/0195389 A1 | 6/2021 | Novlan et al. |
| 2021/0289580 A1 | 9/2021 | Damnjanovic et al. |
| 2023/0026316 A1* | 1/2023 | Chen ................... H04W 76/14 |

* cited by examiner

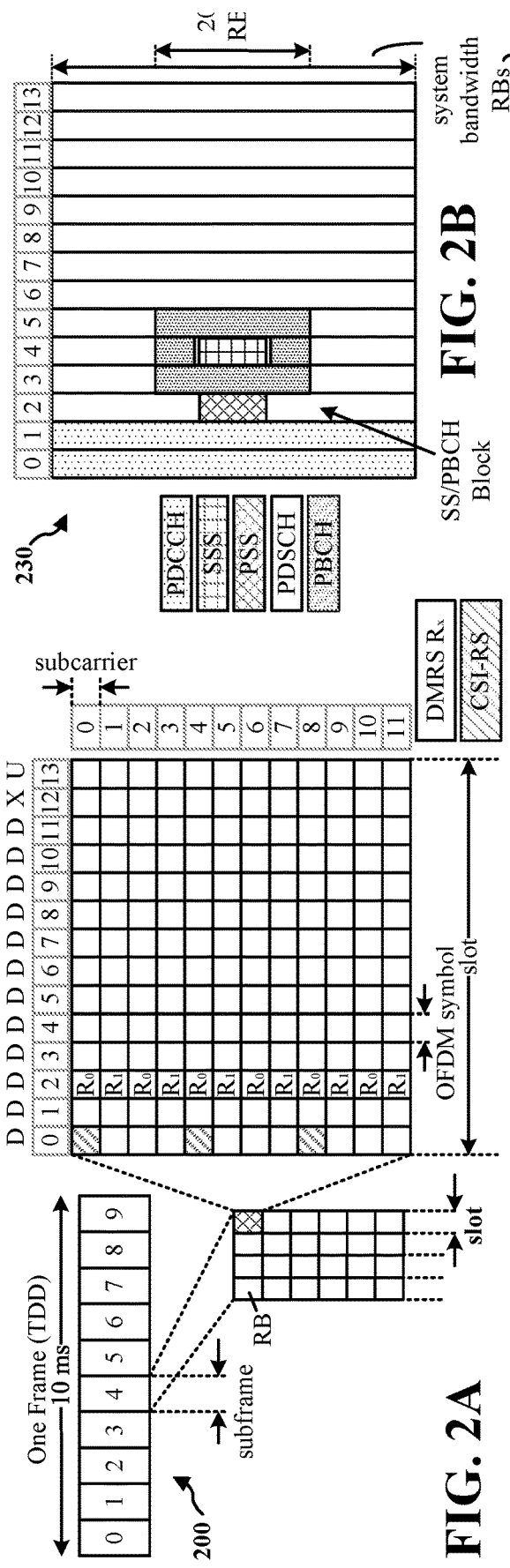
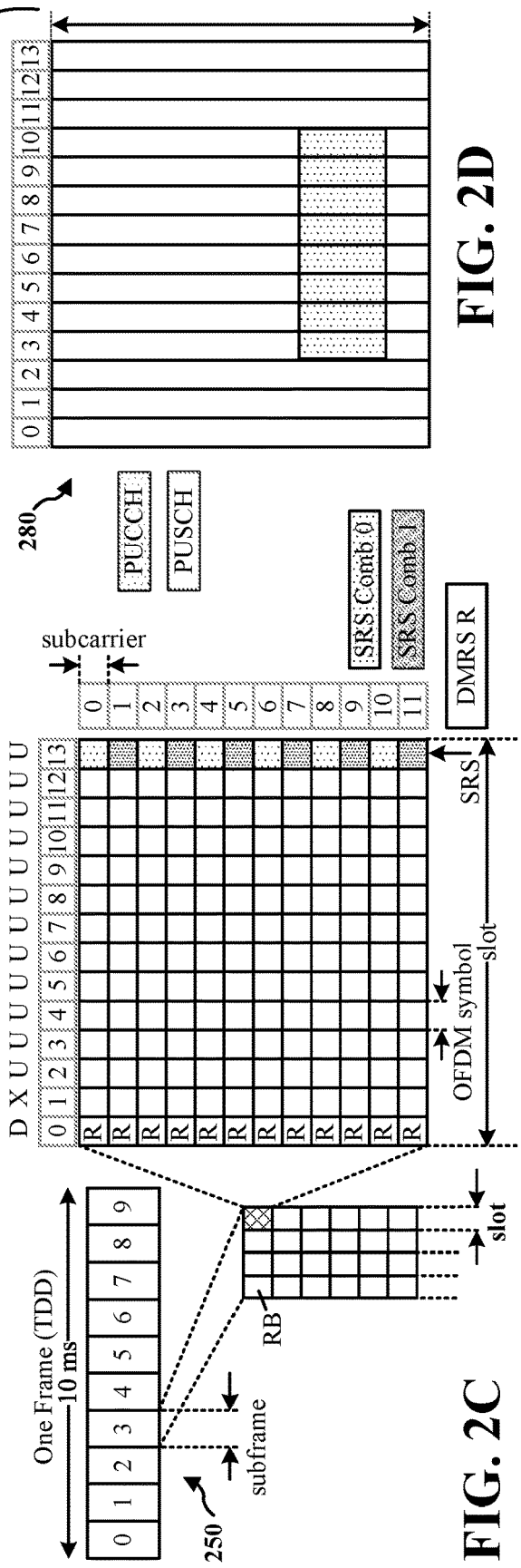
FIG. 2A
FIG. 2B
FIG. 2C
FIG. 2D

USER EQUIPMENT RELAY PROCEDURE

CROSS REFERENCE TO RELATED APPLICATION(S)

This application is a Continuation of U.S. application Ser. No. 17/196,912, entitled "USER EQUIPMENT RELAY PROCEDURE" and filed on Mar. 9, 2021, which claims the benefit of and priority to Provisional Application Ser. No. 62/987,834, entitled "USER EQUIPMENT RELAY PROCEDURE" and filed on Mar. 10, 2020," all of which are assigned to the assignee hereof and are incorporated herein by reference in their entireties.

BACKGROUND

Technical Field

The present disclosure relates generally to communication systems, and more particularly, to wireless communication involving relaying.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. The apparatus transmits or receives a relay request of a first user equipment (UE) via sidelink, the first UE being in a radio resource control (RRC) connected mode with a base station. The apparatus receives or transmits, via the sidelink, an indication of relay availability of a second UE in an RRC inactive mode in response to the relay request. The apparatus receives a configuration from the base station for relay of communication from the base station over the sidelink between the first UE and the second UE.

In an aspect of the disclosure, a method, a computer-readable medium, and an apparatus are provided for wireless communication at a UE. The apparatus transmits a request via sidelink for relaying communication between the UE and a base station. The apparatus receives, via the sidelink, an indication of availability from one or more relay devices including the relay device. The apparatus transmits a notification to the base station of the availability of the one or more relay devices. The apparatus receives a configuration from the base station for sidelink communication with a relay device to relay the communication between the UE and the base station.

In an aspect of the disclosure, a method, a computer-readable medium, and an apparatus are provided for wireless communication at a base station. The apparatus receives a notification that one or more relay devices are available for relaying communication between a UE and the base station, where the UE is in an RRC connected mode with the base station, and wherein the one or more relay devices are in an RRC inactive mode with the base station. The apparatus configures the UE to relay the communication with the base station using sidelink communication with a relay device from the one or more relay devices. The apparatus configures relay device to relay communication between the UE and the base station using sidelink communication.

In an aspect of the disclosure, a method, a computer-readable medium, and an apparatus are provided for wireless communication at a relay device. The apparatus receives a request from a UE via sidelink for relaying communication between the UE and a base station. The apparatus transmits an indication of availability to at least one of the UE or the base station. The apparatus receives a configuration from the base station for sidelink communication with the UE to relay the communication between the UE and the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
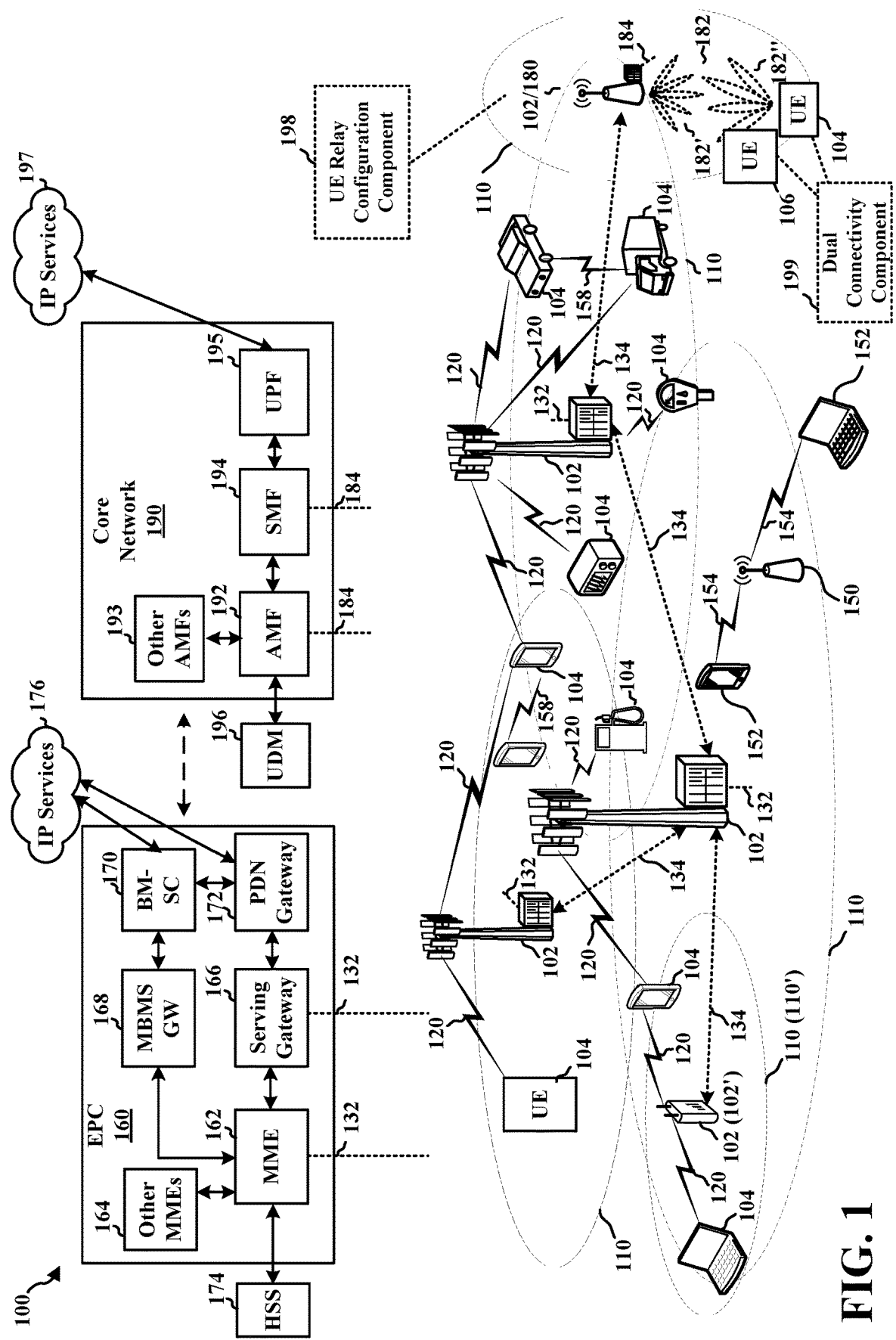
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Aspects presented herein may provide link diversity for wireless devices to improve communications between wireless devices, where a wireless device, such as a UE in an RRC inactive state, may be configured to serve as a relay UE between another UE and a base station to enhance the communication reliability and to provide link diversity for another UE. The configuration of the UE to relay communication between the base station and the other UE may be used to address an impaired or blocked link between the base station and the other UE. By enabling a UE to transition out of an inactive state to serve as a relay may provide link diversity when there are no other RRC connected UEs that can serve as a relay in the vicinity of the UE needing the relay service.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the base station 102 or 180 may include a UE relay configuration component 198 configured to configure a sidelink relay operation for a relay UE 106 and a remote UE 104. In one configuration, the UE relay configuration component 198 may be configured to receive a notification that one or more relay devices are available for relaying communication between a UE and the base station, where the UE is in an RRC connected mode with the base station, and wherein the one or more relay devices are in an RRC inactive mode with the base station. In such a configuration, the UE relay configuration component 198 may configure the UE to relay the communication with the base station using sidelink communication with a relay device from the one or more relay devices. In such a configuration, the UE relay configuration component 198 may configure the relay device to relay the communication between the UE and the base station using sidelink communication.

In certain aspects, the UE 104 may include a dual connectivity component 199 configured to transmit/receive a relay traffic for another UE and/or communicate with a base station through a relay device/UE. In one configuration, the dual connectivity component 199 may be configured to transmit or receive a relay request of a first UE via sidelink, the first UE being in an RRC connected mode with a base station. In such a configuration, the dual connectivity component 199 may receive or transmit, via the sidelink, an indication of relay availability of a second UE in an RRC inactive mode in response to the relay request. In such a configuration, the dual connectivity component 199 may receive a configuration from the base station for relay of communication from the base station over the sidelink between the first UE and the second UE.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 602.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming. The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. User Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/negative ACK (NACK) feedback. The PUSCH carries data, and may additionally be used to carry a buffer status report (BSR), a power headroom report (PHR), and/or UCI.

Figure 3:
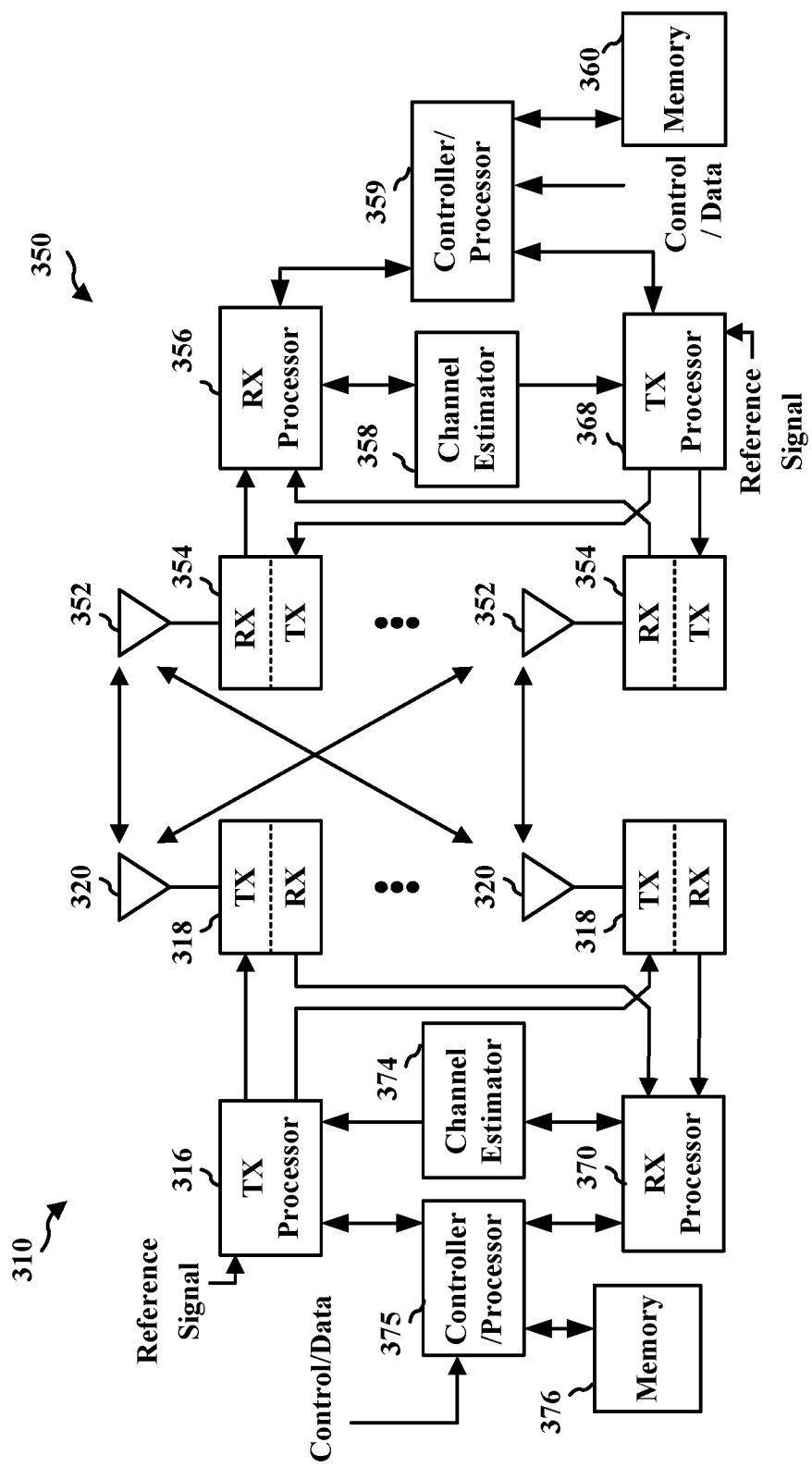
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the dual connectivity component 199 of FIG. 1.

At least one of the TX processor 316, the RX processor 370, and the controller/processor 375 may be configured to perform aspects in connection with the UE relay configuration component 198 of FIG. 1.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

At higher frequency bands, such as FR2 or above, radio propagation may become more difficult compared to lower frequency bands. For example, as frequency of wireless communication increases, the wavelength decreases, and the shorter wavelengths may be more susceptible to atmospheric and environmental interference. For example, higher frequency transmissions may be more likely to be absorbed by physical barriers such as walls, ceilings, and/or other structures, such that a communication link between a UE and a base station may be impaired or blocked.

Aspects presented herein may provide link diversity for wireless devices to improve communications between wireless devices, where a wireless device, such as a UE in an RRC inactive state, may be configured to serve as a relay UE between another UE and a base station to enhance the communication reliability and to provide link diversity for the another UE.

In some aspects, it may be beneficial to transition a UE out of an inactive state to serve as a relay if another RRC connected UE that can serve as a relay is not in the vicinity of the UE needing the relay service. By providing the ability for an RRC inactive UE to provide support for communication between a base station and another UE helps to provide that UE with service or with more reliable service even in the absence of RRC connected UEs capable of providing the relay service. In some aspects, the relay UE and the UE for which the communication is relayed may have an association or relationship. One non-limiting example of a relationship is a watch or an extended reality (XR) and a related phone. In some aspects, the power of the relay UE may be used to provide the service to the other UE. As discussed herein, a network may decide whether or not to activate an RRC inactive UE to operate as a relay. As well, the UE may refrain from advertising an ability to provide a relay service.

Figure 4:
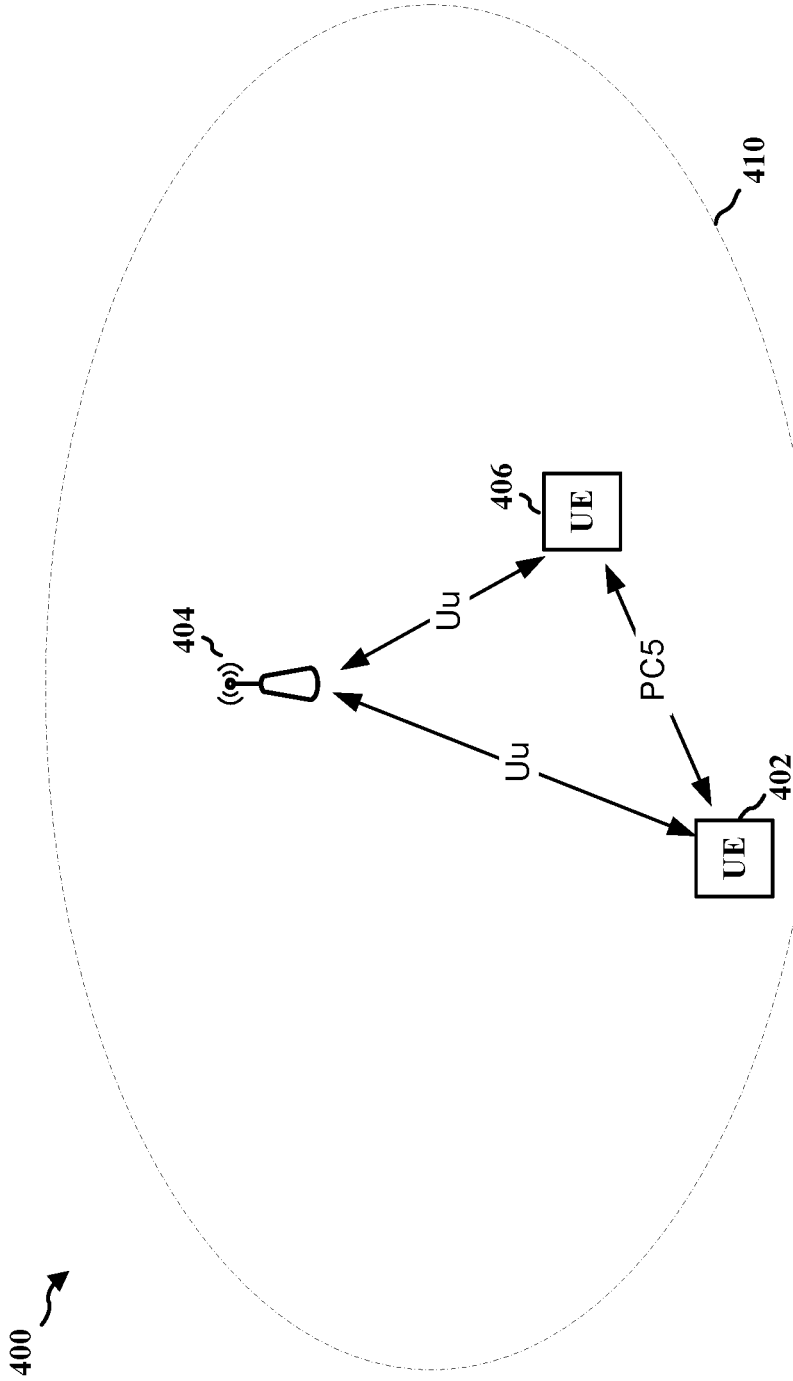
FIG. 4 is a diagram illustrating an example of wireless relaying in a cellular network.

FIG. 4 is a diagram 400 illustrating an example of a wireless relaying between a remote UE, a relay UE and a base station. In one example, a base station 404 may provide communication coverage for a geographic coverage area 410. A remote UE 402 and a relay UE 406 may be within the coverage area 410 provided by a base station 404. The remote UE 402 may be connected (e.g., RRC connected) to the base station 404, and may request relay services from the base station 404 for various purposes. For example, there may be atmospheric and environmental interference between the remote UE 402 and the base station 404, where data transmission between the remote UE 402 and the base station may be improved through the relay UE 406. In other examples, the remote UE 402 may be configured to improve the transmission speed and/or reliability based on link diversity, where the remote UE 402 may connect the base station 404 through multiple links (or connections). For example, the remote UE 402 may employ a dual connectivity technique by simultaneously connecting to the base station 404 directly (e.g., through RRC connection) and indirectly (e.g., through a relay UE 406 using a sidelink connection), where the remote UE 402 may communicate with the base station 404 over a Uu interface and with the relay UE 406 over a PC5 interface. As such, the remote UE 402 may communicate with the base station 404 through two different paths by using two simultaneous protocol stacks, as described below. In some examples, the relay UE 406 may be a stationary device, such as a stationary UE relay or a stationary relaying device.

Figure 5:
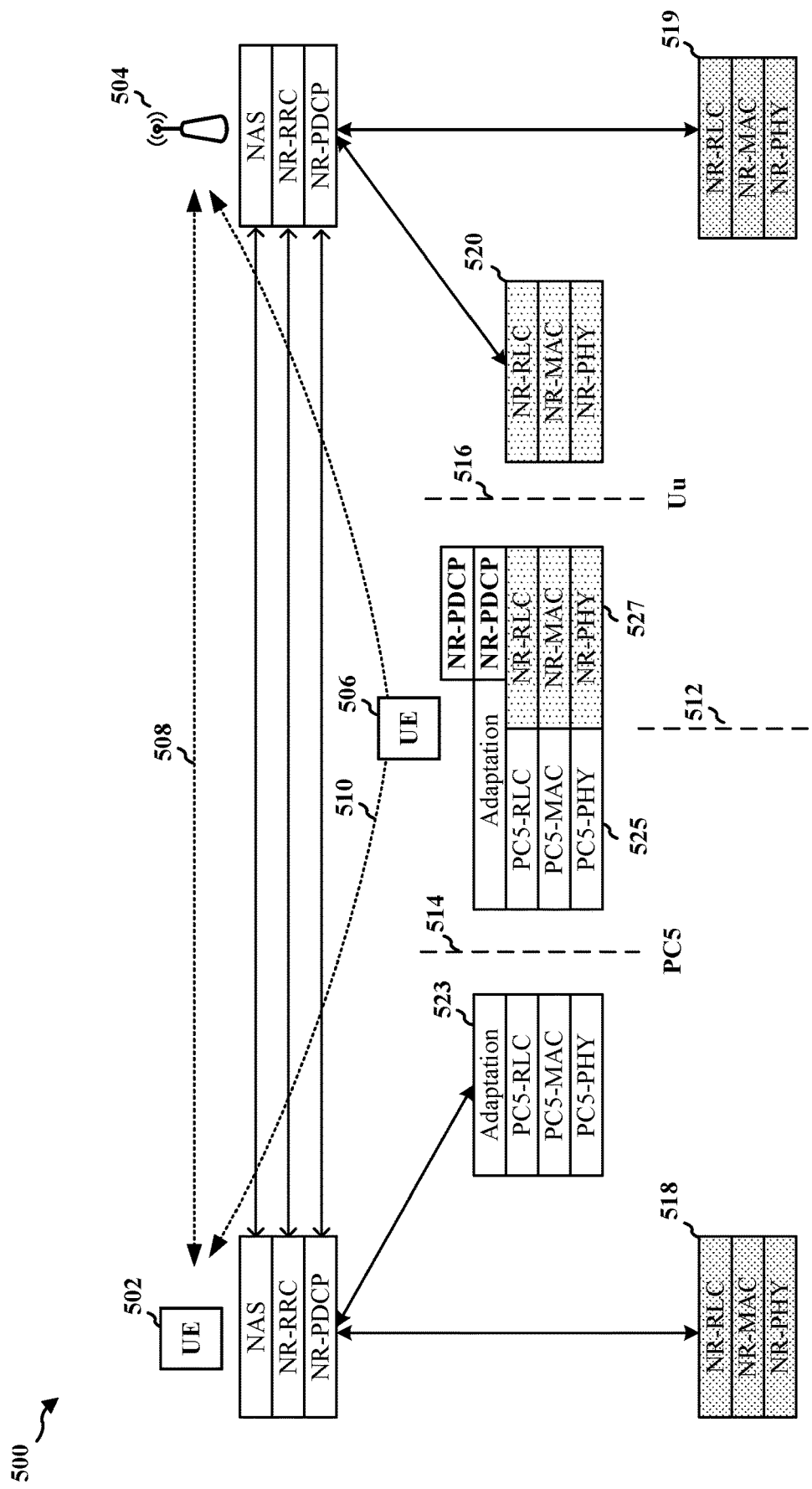
FIG. 5 is a diagram illustrating an example of user-plane protocol stacks for the dual connectivity.

FIG. 5 is a diagram 500 illustrating an example of multiple user-plane protocol stacks for a remote UE configured with dual connectivity. In one example, a remote UE 502 may simultaneously establish a first connection 508 (i.e., a link) directly with a base station 504 and a second connection 510 indirectly through a relay UE 506 (e.g., with the remote UE 502 having a link established with the relay UE 506, and the relay UE 506 having a link established with the base station 504). The multiple protocol stacks may provide a layer 2 (L2) relay option for relayed communication between the UE 502 and the base station 504 (e.g., relayed through the UE 506). The remote UE 502, the base station 504 and the relay UE 506 may correspond to the remote UE 402, the base station 404 and the relay UE 406 in FIG. 4. In some examples, the relay UE 506 may be a stationary device, such as a stationary UE relay or a stationary relaying device.

In one example, each of the remote UE 502 and the relay UE 506 may be configured with at least two radio interfaces, where one radio interface (e.g., a Uu interface) is for communicating with the base station 504 and the other radio interface (e.g., a PC5 interface) is for communicating with another UE (e.g., between the remote UE 502 and the relay UE 506). For example, the remote UE 502 and the base station 504 may communicate with each other through a Uu interface 512 (e.g., via the first connection 508) based on a first protocol stack 518 at the remote UE 502 and a first protocol stack 519 at the base station 504. Additionally, or as an alternative, the remote UE 502 and the base station 504 may also communicate with each other through the relay UE 506 (e.g., using the second connection 510). For example, the relay UE 506 and the remote UE 502 may be configured to communicate (e.g., transmit/receive data packets) with each other via a PC5 interface 514 based on a PC5 protocol stack 523 at the remote UE 502 and a corresponding PC5 protocol stack 525 at the relay UE 506. Similarly, the relay UE 506 and the base station 504 may be configured to communicate with each other via a Uu interface 516 based on the protocol stack 527 at the relay UE 506 and a corresponding protocol stack 520 at the base station 504. In some examples, the communication between the remote UE 502 and the relay UE 506 may be based on a sidelink communication, and the communication between the remote UE 502 and the base station 504 and/or between the relay UE 506 and the base station 504 may be based on an uplink and/or a downlink communication (e.g., based on an RRC connection).

In some example, the remote UE 502 and/or the base station 504 may transmit a same, duplicate data through the first connection 508 and the second connection 510. The dual transmission may enhance the reliability of the transmission as the same data is being transmitted via two different links. For example, if one of the connection disconnects, the remote UE 502 and/or the base station 504 may still communicate with each other via another connection. As such, a user traffic may be split between carriers in PDCP layer and data bearer, which may be referred to as "split-bearer." The split-bearer PDCP functionality may apply to both signaling and the data bearers.

In other examples, the remote UE 502 and/or the base station 504 may transmit different data through the first connection 508 and the second connection 510. For examples, the remote UE 502 and/or the base station 504 may split a data and transmit one portion of the data through the first connection 508 (e.g., using protocol stacks 518 and 519) and another portion of the data through the second connection 510 (e.g., using protocol stacks 523 and 520). This may enhance the speed of the transmission as more bandwidth may be utilized via a link aggregation.

In other examples, the remote UE 502 and/or the base station 504 may transmit a data selectively between the first connection 508 and the second connection 510 depending on which connection has better connection quality and/or resource availability (i.e., link selections), where the selection may be based at least in part on time division duplex (TDD) configurations, transmission/receiver beam choice and/or carrier frequency of the transmission, etc. For example, the base station 504 may have a better observation and/or insights on the channel traffics/conditions as the base station 504 may have more control over links established through the Uu interface 512 and the Uu interface 516. Therefore, the base station 504 may make more informed decisions regarding the scheduling of data transmissions on sidelink between the remote UE 502 and the relay UE 506. Further, to improve or ensure a robust operation under the link diversity, radio link monitoring (RLM) may be applied for the Uu interface 512. the Uu interface 516, and/or the PC5 interface 514. Based on the RLM, the base station 504 may monitor and detect whether there is a disconnection or a worsen channel condition on any of the radio link (e.g., connections 508 and 510), and the base station 504 may declare a radio link failure (RLF) if it detects that both links towards the remote UE 502 fail or the transmission qualities for both links are below a threshold.

In some examples, the dual connection mechanism may facilitate a faster link aggregation and link selection by enabling a base station to provide control signaling to a remote UE and/or a relay UE (e.g., from the base station 404 to the UE 402 and/or the UE 406). For example, the base station 504 may schedule the data transmission on the Uu interface 512, the Uu interface 516, and/or the PC5 interface 514 (e.g., sidelink) one at the time or simultaneously. In addition, a base station (e.g., the base station 504) may use RRC signaling as a controlling entity for configuring a relay UE (e.g., the relay UE 106, 406, 506, 406, 506, 606, 706, 806) on both a Uu interface and a PC5 interface. This may ensure that an appropriate bearer is mapped to a localized channel (LCH), and data transmission/assignment between the base station and relay UE/remote UE may be prioritized.

In some examples, a remote UE (e.g., the remote UE 402, 502) may be RRC connected (e.g., in an RRC active state) to a base station (e.g., base station 404, 504), while a relay UE (e.g., the relay UE 406, 506) may be in a connectionless mode (e.g., in an RRC inactive state) with the base station but still within the coverage area of the base station. In one aspect of the present disclosure, if the relay UE is active on a sidelink, the remote UE may be configured to notify the relay UE or the base station to transition the relay UE from an RRC inactive state to an RRC active state (e.g., to be RRC connected to the base station). After the relay UE is RRC connected to the base station, the remote UE may use the relay UE for relay services and/or the base station may control the transmission between the remote UE and the relay UE on a sidelink (e.g., PC5 interface).

Aspects presented herein may enable a UE or a base station to pull another UE out of an inactive state to serve as a relay, such as when there are no other RRC connected UEs that may serve as a relay device in the vicinity of the UE requesting the relay service. As lack of RRC connected UEs may deprive a remote UE from a reliable relaying service, a trade on the power of a relay UE for the relay service being provided to another UE may be a beneficial tradeoff in many cases (e.g., for certain type of services that are provided to UE, or for UEs that are associated with each other or have a special relationship, such as between a smart phone and a smart watch). In one example, the network may determine whether or not to activate an inactive UE as a relay after receiving a relay request from a remote UE. In another example, if a relay UE is unable to serve as a relay, the relay UE may not advertise itself for relaying on the side link and/or the relay UE may advertise itself for not providing any relay services.

Figure 6:
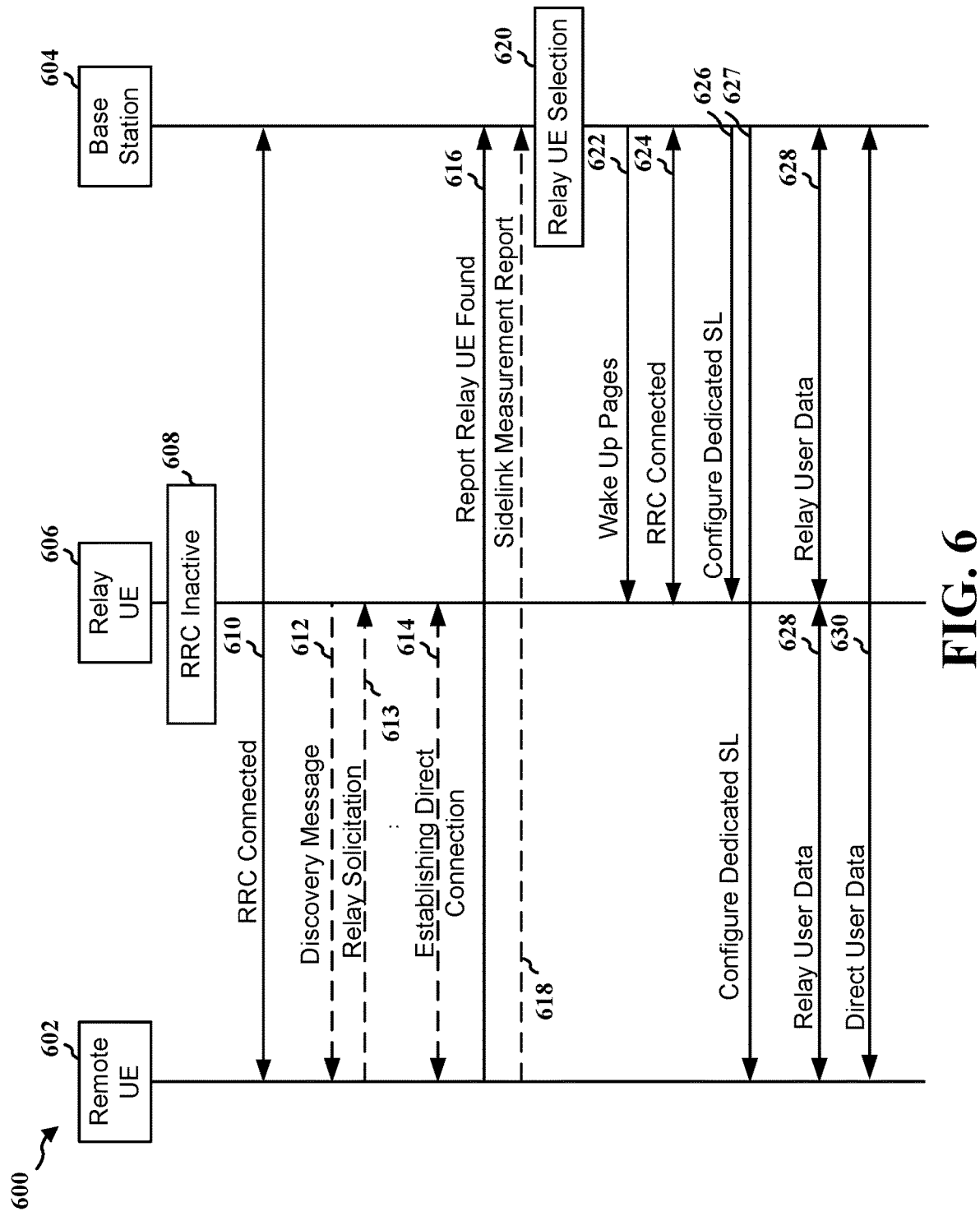
FIG. 6 is an example communication flow between a remote UE, a relay UE and a base station according to aspects of the present disclosure.

FIG. 6 is a communication flow 600 illustrating an example of wireless relaying between a remote UE 602, a relay UE 606, and a base station 604 accordingly aspects of the present disclosure, which may correspond to the remote UE 402, 502, the relay UE 406, 506 and the base station 404, 504 in FIGS. 4 and 5 respectively. Optional aspects may be illustrated in dashed line. In one example, as shown at 610, the relay UE 606 may not initially be RRC connected with the base station 604 (e.g., in an RRC inactive state or in an idle mode) but may be active on a sidelink (e.g., is able to communicate with other UE or sidelink devices over the sidelink), whereas the remote UE 602 may be RRC connected to the base station 604 (e.g., in an RRC connected state), such as shown at 610.

In one aspect, the relay UE 606 may facilitate a sidelink discovery to serve as a relay, where the relay UE 606 may be configured to listen for/attempt to detect relay request(s) from nearby UE(s) during one or more monitoring occasions. In one example, as shown at 612, to enable nearby UE(s) to identify the relay UE 606, the relay UE 606 may announce its presence by transmitting sidelink discovery messages periodically. The sidelink discovery message may indicate the relay UE 606's capability to serve as a relay and/or may indicate the relay UE 606's sidelink communication capabilities. At 613, if the remote UE 602 is searching for a relay device/service, the remote UE 602 may also be configured to transmit/broadcast sidelink relay solicitation messages periodically. The sidelink relay solicitation message may include a request for a relay to the base station 604, which may be referred to as a relay request, a relay solicitation, or other names. If the remote UE 602 receives the sidelink discovery message from the relay UE 606, the remote UE 602 may obtain the UE ID of the relay UE 606, which may be used by the remote UE 602 for sidelink transmission and reception of the relayed traffic.

In some examples, the indication of the relay UE 606's presence as a potential relay (e.g., the sidelink discovery message transmitted at 612) may be sent after the remote UE 602's request for a relay (e.g., the sidelink relay solicitation message transmitted at 613). Thus, in response to the sidelink relay solicitation message received from the remote UE 602, the relay UE 606 may indicate its availability to operate as a relay between the remote UE 602 and the base station 604. In some examples, the sidelink discovery message transmitted at 612 may be a broadcast indication that is broadcast over sidelink to one or more UEs, or it may be a unicast message that is transmitted to the remote UE 602 over the sidelink.

At 614, after the remote UE 602 receives the sidelink discovery message from the relay UE 606 and/or after the relay UE 606 receives the sidelink relay solicitation message from the remote UE 602, the relay UE 606 and the remote UE 602 may establish a direct communication (e.g., a PC5 connection) with each other. For example, the remote UE 602 and the relay UE 606 may perform a mutual authentication (e.g., direct security mode) procedure. In some examples, the remote UE 602 and/or the relay UE 606 may use a PC5 signaling protocol for direct connection management functions, such as direct link setup/release, security parameter control, and/or IP address allocation, etc. In other examples, the remote UE 602 and the relay UE 606 may negotiate for the relaying of communication between the remote UE 602 and the base station 604.

At 616, after the remote UE 602 and the relay UE 606 have established a direct connection with each other or after the remote UE 602 discovers the presence of the relay UE 606, the remote UE 602 may transmit a message (e.g., a relay UE found report) to the base station 604 informing the base station 604 about the relay UE 606 being a potential candidate for providing relaying between the remote UE 602 and the base station 604. For example, the message transmitted at 616 may indicate the presence and/or the availability of the relay UE 606, such that the remote UE 602 may notify the base station 604 that it has found a suitable relay candidate. In some examples, as shown at 618, the remote UE may also transmit a sidelink measurement report to the base station 604, where the sidelink measurement report may include sidelink measurements between the remote UE 602 and the relay UE 606. For example, the sidelink measurement report 618 may correspond to a measured channel quality (e.g., sidelink-reference signal received power (RSRP)) between the remote UE 602 and the relay UE 606. As such, the sidelink measurement report may explicitly or implicitly include the relay UE 606's identifier (e.g., the UE ID of the relay UE 606).

At 620, based on the message received at 616 and/or the sidelink measurement report received at 618, the base station 604 may perform a relay UE selection to determine whether the relay UE 606 has met the threshold/criteria for being a relay and/or whether another relay UE is a more suitable or better candidate for relay if there are multiple relay candidates. For example, based on the sidelink measurement report received at 618, the base station 604 may select the relay UE 606 for providing relay services based on the RSRP measurement between the remote UE 602 and the relay UE 606. However, if the RSRP measurement does not meet a threshold, the base station 604 may not select the relay UE 606 for providing relay services, and the relay UE 606 may be prevented from providing relay services. In other examples, if there are multiple relay UE candidates, the base station 604 may select a relay UE candidate having a best/highest RSRP measurement among the relay UE candidates. In some examples, such as in the cases of a sidelink-negotiated relaying, the remote UE 602 and the relay UE 606 may negotiate with each other regarding the sidelink relaying, and the base station 604 may not decide which relay UE is to be used by the remote UE 602 for relaying.

If the relay UE 606 is selected or authorized by the base station 604 for relay during the relay UE selection at 620, at 622, the base station 604 may transmit one or more wake up pages to the relay UE 606 to request the relay UE 606 to connect with the base station 604 (e.g., to transition into an RRC connected mode). At 624, in response to the one or more wake up pages, the relay UE 606 may establish an RRC connection with the base station 604. After the base station 604 and the relay UE 606 are RRC connected, at 626 and 627, the base station 604 may configure a dedicated sidelink channel for the remote UE 602 and relay UE 606, such that the remote UE 602 and relay UE 606 may communicate with each other over the dedicated sidelink channel. Then, the remote UE 602 and/or the relay UE may communicate with each other and with the base station based on the dual connectivity, such as described in connection with FIG. 5. For example, as shown at 628, the remote UE 602 may indirectly transmit and/or receive user data from the base station 604 through the relay UE 606, and/or as shown at 630, the remote UE 602 may directly transmit and/or receive user data from the base station 604. In other words, the remote UE 602 may receive data from the base station 604 indirectly as relayed user data from the relay UE 606, and/or the remote UE 602 may directly receive data from the base station 604, e.g., as described in connection with FIGS. 4 and 5. Similarly, the remote UE 602 may transmit uplink data to the base station 604 as a direct user data or indirectly as relayed user data via the relay UE 606, etc. The sidelink communication (e.g., using the PC5 interface) between the remote UE 602 and the relay UE 606 may be based on the dedicated sidelink channel that is configured for the two UEs by the base station 604. On the other hand, the relay UE 606 may continue to stay in an RRC inactive mode if the base station 604 does not select or authorize the relay UE 606 for the relaying at the relay UE selection at 620.

In another aspects of the present disclosure, instead of the remote UE 602 notifying the base station 604 regarding its discovery of the relay UE 606 as a potential relay candidate, such as discussed in connection with 616 and 618 of FIG. 6, the relay UE 606 may be configured to inform the base station 604 (e.g., through an RRC resume request or other message(s)) if the relay UE 606 discovers a remote UE, such as the remote UE 602, has requested a relaying service.

Figure 7:
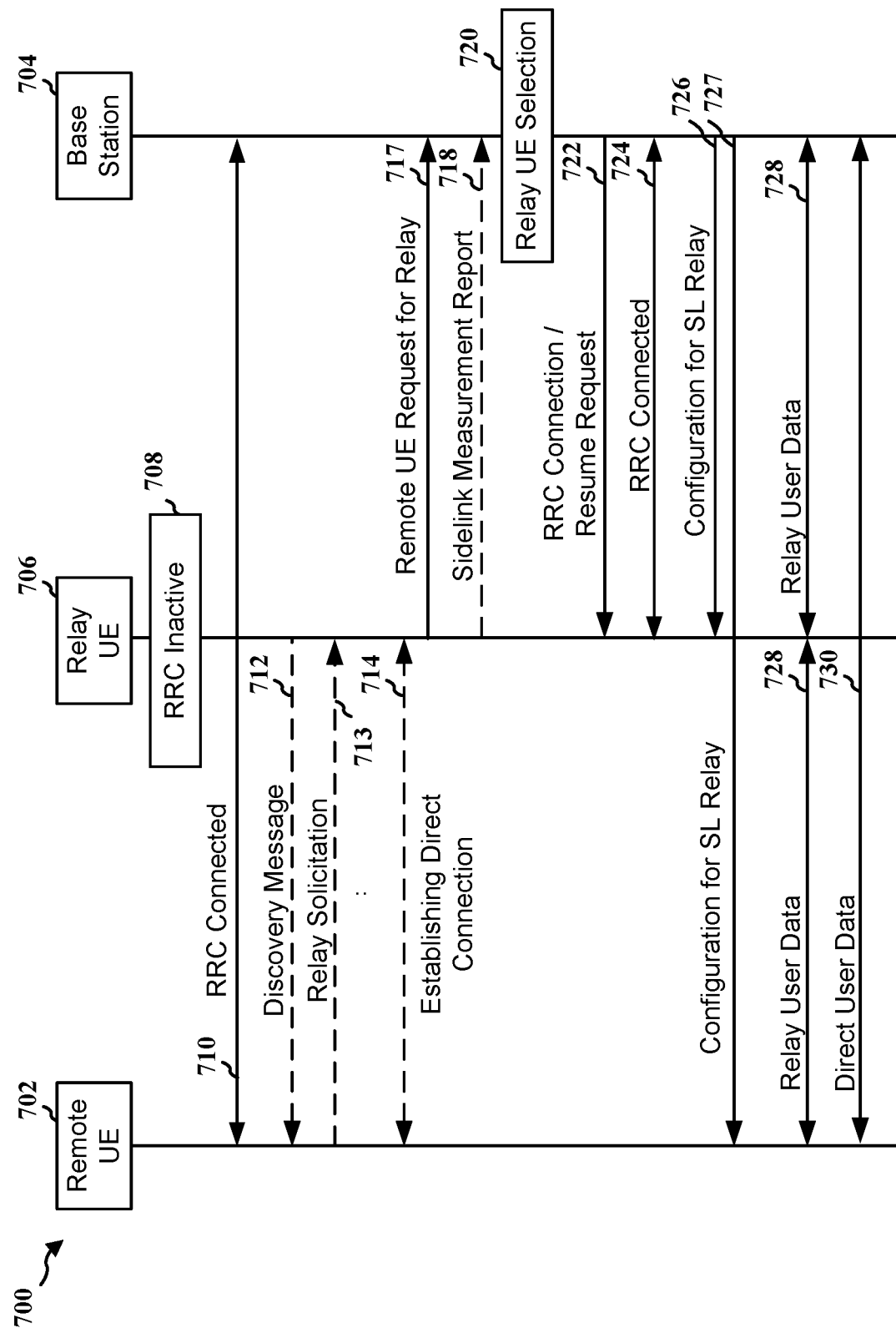
FIG. 7 is an example communication flow between a remote UE, a relay UE and a base station according to aspects of the present disclosure.

FIG. 7 is communication flow 700 illustrating an example of wireless relaying between a remote UE 702, a relay UE 706, and a base station 704 according to aspects of the present disclosure, which may correspond to the remote UE 402 or 502, the relay UE 406 or 506 and the base station 404 or 504 in FIGS. 4 and 5 respectively. Optional aspects may be illustrated with dashed lines. As described in connection with FIG. 6, at 708, the relay UE 706 may be in an RRC inactive mode, where the relay UE 706 may not be RRC connected to the base station 704 but may be active on a sidelink (e.g., able to communicate over the sidelink). On the other hand, as shown at 710, the remote UE 702 may have an established RRC connection with the base station 704. In one example, the relay UE 706 may transmit signals that assist the remote UE 702 in discovering the relay UE 706's presence and capability to operate as a relay to the base station 704. The discovery process may include aspects described in connection with 612, 613 and 614 of FIG. 6, where the relay UE 706 may monitor for the remote UE's 702 request for relaying (e.g., the relay solicitation transmitted from the remote UE 702 at 713) and/or that the relay UE 706 may broadcast its availability to provide a relaying service to the base station 704 (e.g., via the discovery message transmitted at 712). After the discovery message transmitted by the relay UE at 712 is received by the remote UE 702 or the relay request transmitted by the remote UE 702 is received by the relay UE 706, at 714, a direct link 714 (e.g., a PC5 connection) may be established between the relay UE 706 and the remote UE 702. The remote UE 702 and the relay UE 706 may communicate with each other and perform a mutual authentication (e.g., direct security mode) procedure. In some examples, the remote UE 702 and/or the relay UE 706 may a PC5 signaling protocol to establish direct connection management functions such as direct link setup/release, security parameter control, and IP address allocation.

After the remote UE 702 and the relay UE 706 have established a direct connection or after the relay UE has received relay request from the remote UE 702, at 717, the relay UE 706 may notify the base station 704 about the remote UE 702's request for relaying. In one example, the notification at 717 may be carried in an RRC resume request message. In another example, the notification may be transmitted after the relay UE 706 transmits an RRC resume request to the base station 704, such as via another message or signaling. In one example, the relay UE 706 may use the remote UE 702's relay request (e.g., received at 713) to notify the base station 704 that it has the capacities to provide the relay service for the remote UE 702 and/or to indicate the relay UE 706's relay capabilities. At 718, the relay UE may optionally include a sidelink measurement report, which may correspond to a measured channel quality (e.g., sidelink-RSRP) between the remote UE 702 and the relay UE 706. The relay UE measurement report 718 may also explicitly or implicitly include the relay UE 706's identifier.

In some examples, the relay UE 706 may choose to establish an RRC connection with the base station 704 at 717. In other examples, the relay UE 706 may decide to resume an RRC connection until it is selected as a relay for the remote UE 702. For example, at 720, based on the remote UE request for relay report received at 717 and/or the sidelink measurement report received at 718, the base station 704 may perform a relay UE selection to determine whether the relay UE 706 has met the threshold for being a relay and/or whether another relay UE is a more suitable or a better candidate for relay if there are multiple relay candidates. In some examples, in the case of sidelink-negotiated relaying, the base station 704 may not have decision over which relay UE is to be used for relaying.

If the relay UE 706 is selected or authorized by the base station 704 to operate as a relay at relay UE selection at 720, the base station 704 may configure the relay UE 706 and/or the remote UE 702 for sidelink communication in order for the relay UE 706 to relay communication between the remote UE 702 and the base station 704. For examples, at 722, the base station 704 may send one or more RRC connection/resume request pages to the relay UE 706 to request the relay UE 706 to connect with the base station 704 (e.g., to transition into an RRC connected mode) if the relay UE 706 has not connected with the base station 704 yet. Then, at 724, in response to the one or more RRC connection/resume request pages, the relay UE 706 may establish an RRC connection with the base station 704.

After the base station 704 and the relay UE 706 are RRC connected, at 726 and 727, the base station 704 may configure a dedicated sidelink channel for the remote UE 702 and relay UE 706, such that the remote UE 702 and relay UE 706 may communicate with each other over the dedicated sidelink channel. Then, the remote UE 702 and/or the relay UE may communicate with each other and with the base station based on the dual connectivity, such as described in connection with FIG. 5. For example, as shown at 728, the remote UE 702 may indirectly transmit and/or receive user data from the base station 704 through the relay UE 706, and/or as shown at 730, the remote UE 702 may directly transmit and/or receive user data from the base station 704, e.g., as described in connection with FIGS. 4 and 5. On the other hand, the relay UE 706 may continue to stay in an RRC inactive mode if the base station 704 does not select or authorize the relay UE 706 for the relaying at the relay UE selection at 720.

In another aspect of the present disclosure, a remote UE (e.g., the remote UE 402, 502) may be RRC connected to a base station (e.g., base station 404, 504) while a relay UE (e.g., relay UE 406, 506) may be in an RRC inactive mode (e.g., without an active RRC connection with the base station) and the relay UE may also have an inactive sidelink, where the remote UE may not be monitoring for relaying requests from nearby UE(s) or the remote UE may be monitoring for relaying requests less often as compared to an active sidelink.

Figure 8:
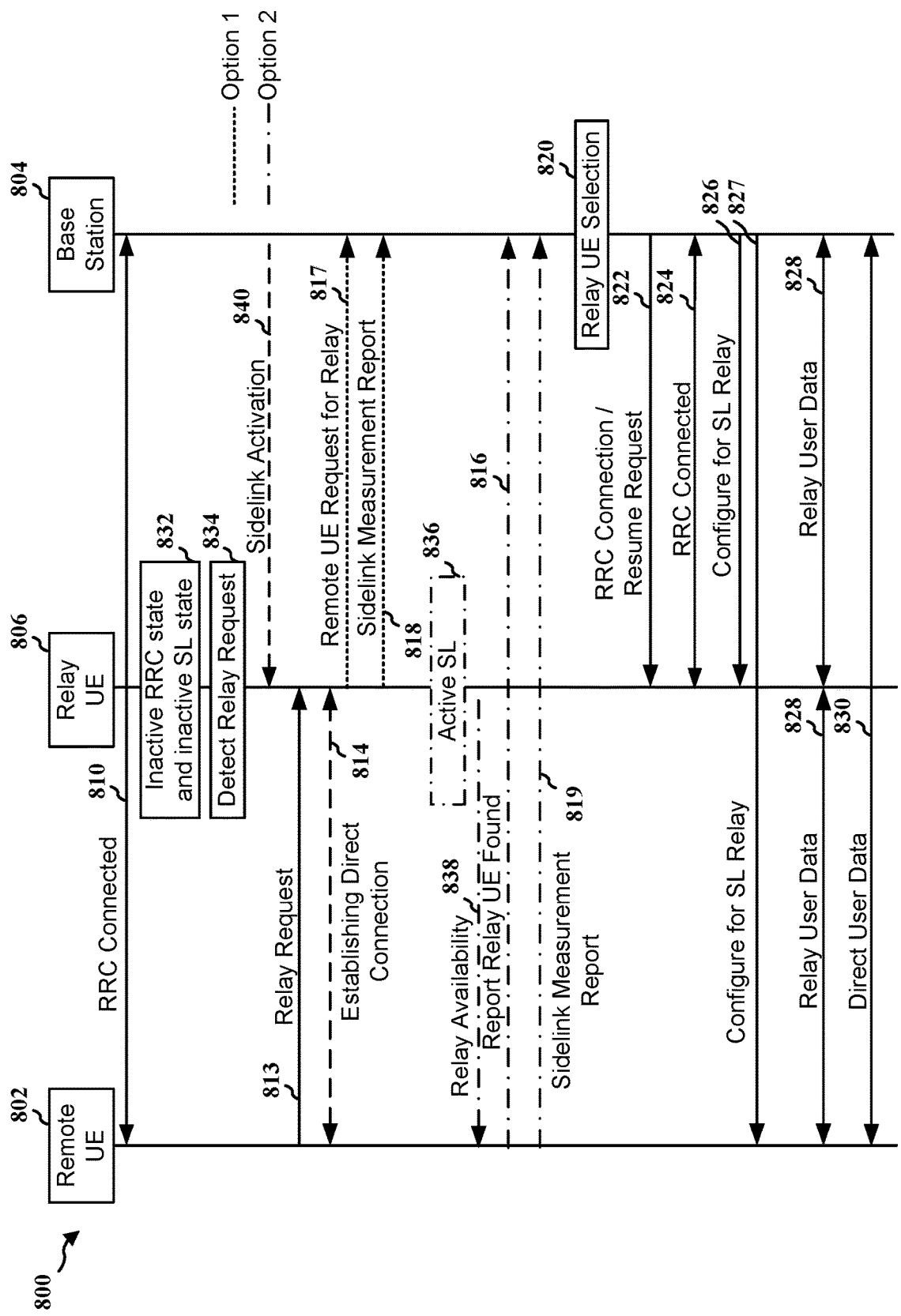
FIG. 8 is an example communication flow between a remote UE, a relay UE and a base station according to aspects of the present disclosure.

FIG. 8 is communication flow 800 illustrating an example of wireless relaying between a remote UE 802, a relay UE 806, and a base station 804 accordingly aspects of the present disclosure, which may correspond to the remote UE 402, 502, the relay UE 406, 506 and the base station 404, 504 in FIGS. 4 and 5. Optional aspects may be illustrated in dashed line.

At 810, the remote UE 802 may be RRC connected to the base station 804. However, as shown at 832, the relay UE 806 may both be in an inactive RRC state and in an inactive sidelink state. In some examples, as shown at 834, if the relay UE 806 is inactive on the sidelink, the relay UE 806 may monitor for or detect relay request from nearby UE(s), but the relay UE 806 may not transmit any discovery requests to broadcast its presence. In other examples, the relay UE 806 may monitor for relay requests in a reduced manner. In one example, the relay UE 806 may observe monitoring occasions having reduced periodicity and/or duration than observed by the relay UE 806 when the relay UE 806 is in an active sidelink mode. In another example, the relay UE 806 may be configured to monitor for relay request only on certain monitoring occasions. In another example, the relay UE 806 may not monitor for any relay requests when the relay UE 806 is in an inactive sidelink mode.

At 813, the remote UE 802 may transmit/broadcast a relay request. If the relay UE 806 receives the relay request from the remote UE 802, at 814, the relay UE 806 and the remote UE 802 may establish a direct communication (e.g., a PC5 connection) with each other, e.g., as described in connection with 614 and 714 of FIGS. 6 and 7 respectively. The remote UE 802 may also communicate to the relay UE 806 or vice versa to perform a mutual authentication (e.g., direct security mode) procedure.

In one example (e.g., option 1 in FIG. 8), at 817, after the remote UE 802 and the relay UE 806 have established a direct connection with each other or after the relay UE 806 receives the relay request from the remote UE 802, the remote UE 802 may notify the base station 804 about remote UE 802's request for relaying. In one example, the notification at 817 may be carried in an RRC resume request message. In another example, the notification may be transmitted after the relay UE 806 transmits an RRC resume request to the base station 804, such as via another message or signaling. In one example, the relay UE 806 may use the remote UE 802's relay request (e.g., received at 813) to notify the base station 804 that it has the capacities to provide the relay service for the remote UE 802 and/or to indicate the relay UE 806's relay capabilities. At 818, the relay UE may optionally include a sidelink measurement report, which may correspond to a measured channel quality (e.g., sidelink-RSRP) between the remote UE 802 and the relay UE 806. The measurement report 818 may also explicitly or implicitly include the relay UE 806's identifier.

Based on the remote UE 802's request for relay report received at 817 and/or the sidelink measurement report received at 818, at 720, the base station 804 may perform a relay UE selection to determine whether the relay UE 806 has met the threshold for being a relay and/or whether another relay UE is a more suitable or a better candidate for relay if there are multiple relay candidates, etc. In some examples, in the case of sidelink-negotiated relaying, the base station 804 may not have decision over which relay UE is to be used for relaying.

In another example (e.g., option 2 in FIG. 8), as shown at 836, after the relay UE 806 receives/detects the relay request from the remote UE 802, the relay UE 806 may transition to an active sidelink state. Then, at 838, the relay UE 806 may notify the remote UE 802 about its availability for providing relaying in response to the received relay request. Then, as described in connection with 616 and 618 of FIG. 6, after receiving the relay availability notification from the relay UE 806, the remote UE 802 may transmit a message (e.g., a relay UE found report) to the base station 804 informing the base station 804 about the relay UE 806 being a potential candidate for providing relaying between the remote UE 802 and the base station 804. For example, the message transmitted at 816 may indicate the presence and/or the availability of the relay UE 806, such that the remote UE 802 may notify the base station 804 that it has found a suitable relay candidate. In some examples, as shown at 818, the remote UE may also transmit a sidelink measurement report 819 to the base station 804, where the sidelink measurement report 819 may include sidelink measurements between the remote UE 802 and the relay UE 806. For example, the sidelink measurement report 819 may correspond to a measured channel quality (e.g., sidelink-RSRP) between the remote UE 802 and the relay UE 806. As such, the sidelink measurement report 819 may explicitly or implicitly include the relay UE 806's identifier (e.g., the UE ID of the relay UE 806).

At 820, based on the message received at 816 and/or the sidelink measurement report received at 818, the base station 804 may perform a relay UE selection to determine whether the relay UE 806 has met the threshold/criteria for being a relay and/or whether another relay UE is a more suitable or better candidate for relay if there are multiple relay candidates. For example, based on the sidelink measurement report received at 818, the base station 804 may select the relay UE 806 for providing relay services based on the RSRP measurement between the remote UE 802 and the relay UE 806. However, if the RSRP measurement does not meet a threshold, the base station 804 may not select the relay UE 806 for providing relay services, and the relay UE 806 may be prevented from providing relay services. In other examples, if there are multiple relay UE candidates, the base station 804 may select a relay UE candidate having a best/highest RSRP measurement among the relay UE candidates. In some examples, such as in the cases of a sidelink-negotiated relaying, the remote UE 802 and the relay UE 806 may negotiate with each other regarding the sidelink relaying, and the base station 804 may not decide which relay UE is to be used by the remote UE 802 for relaying.

Regardless of whether the relay UE 806 or the remote UE 802 notifies the base station 804 (e.g., via option 1 or option 2), if the relay UE 806 is selected or authorized by the base station 804 for relay during the relay UE selection at 820, at 822, the base station 804 may send one or more RRC connection/resume request pages to the relay UE 806 to request the relay UE 806 to connect with the base station 804 (e.g., to transition into an RRC connected mode) if the relay UE 806 has not connected with the base station 804 yet. Then, at 824, in response to the one or more RRC connection/resume request pages, the relay UE 806 may establish an RRC connection with the base station 804.

After the base station 804 and the relay UE 806 are RRC connected, at 826 and 827, the base station 804 may configure a dedicated sidelink channel for the remote UE 802 and relay UE 806, such that the remote UE 802 and relay UE 806 may communicate with each other over the dedicated sidelink channel. Then, the remote UE 802 and/or the relay UE may communicate with each other and with the base station based on the dual connectivity, such as described in connection with FIG. 5. For example, as shown at 828, the remote UE 802 may indirectly transmit and/or receive user data from the base station 804 through the relay UE 806, and/or as shown at 830, the remote UE 802 may directly transmit and/or receive user data from the base station 804, e.g., as described in connection with FIGS. 4 and 5. On the other hand, the relay UE 806 may continue to stay in an RRC inactive mode if the base station 804 does not select or authorize the relay UE 806 for the relaying at the relay UE selection at 820.

In some other examples, the relay UE 806 may not be able to transmit or receive messages from other UE(s) during the inactive sidelink state. In such cases, as shown at 840, the base station 804 may transmit a sidelink activation message to the relay UE 806 to transition the relay UE 806 to an active sidelink state, such that the relay UE 806 may perform the sidelink discovery procedures as described in connection with FIGS. 5-7. Then, the relay UE 806 may perform the discovery process and all process after the discovery as described by FIGS. 6 and/or 7 depending on who notifies the base station 804 about the relay operation/request (e.g., the communication flow 600 may apply if the remote UE 802 notifies the base station 804, and the communication flow 700 may apply if the relay UE 806 notifies the base station 804).

Figure 9:
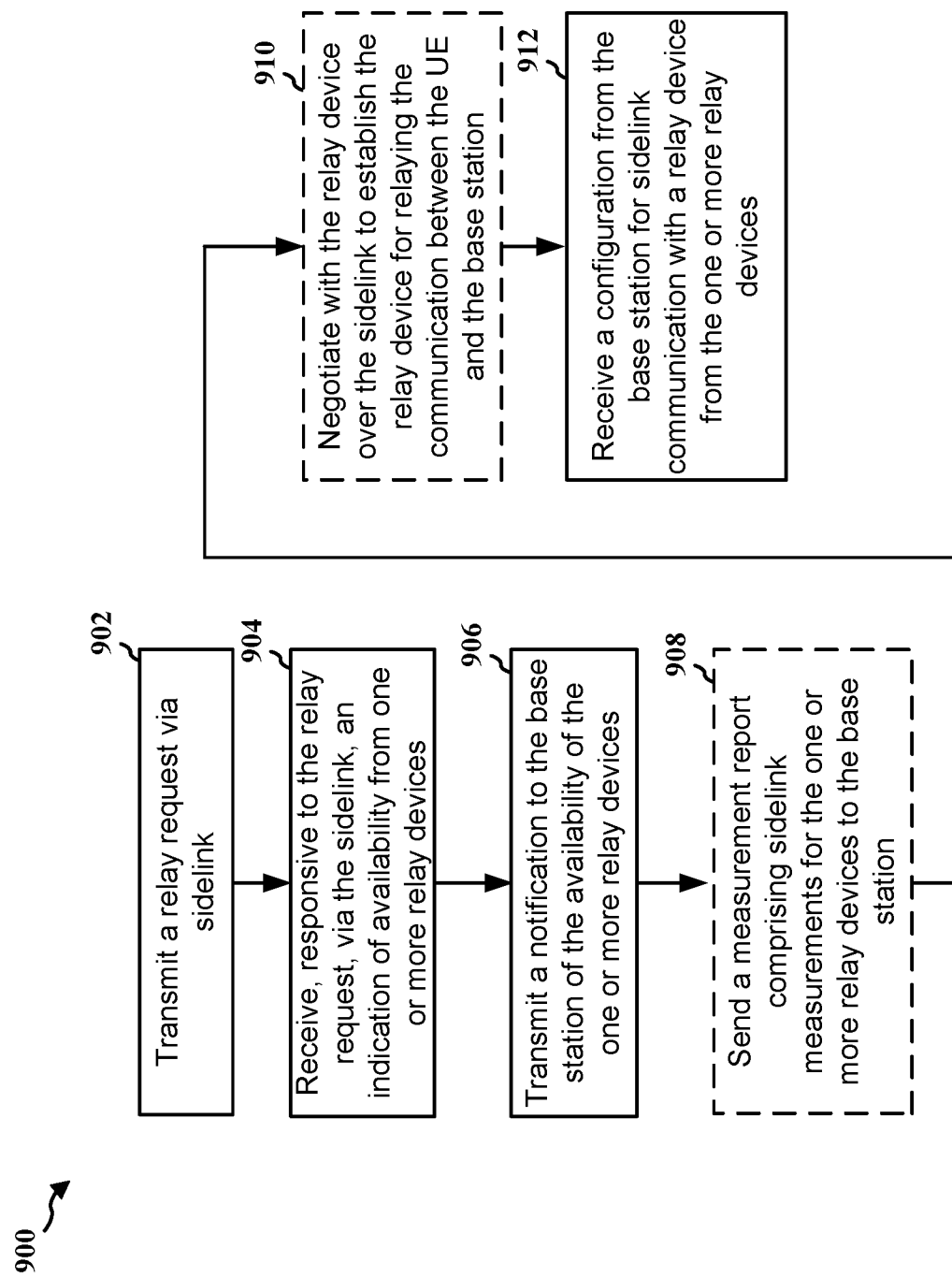
FIG. 9 is a flowchart of a method of wireless communication in accordance with aspects presented herein.

FIG. 9 is a flowchart 900 of a method of wireless communication. The method may be performed by a UE or a component of a UE (e.g., the UE 104, 350, 402, 502, 602, 702, 802; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE (e.g., a remote UE) to notify a base station about the availability of a relay UE that is not connected to the base station.

At 902, the UE may transmit a relay request via sidelink, such as described in connection with FIGS. 6 to 8. For example, at 613, the remote UE 602 may transmit a relay solicitation request to the relay UE 606. The relay request may be a request for a relay device capable of relaying communication between the UE and a base station (e.g., the base station 404, 504, 604, 704, 804). As described in connection with any of FIGS. 4 to 8 (e.g., 613, 713 and 813), the UE may transmit the relay request in order to attempt to detect a suitable a relay device (e.g., the relay UE 406, 506, 606, 706, 806). The transmission of the relay request may be performed, e.g., by the relay request process component 1340 via the transmission component 1334 of the apparatus 1302 in FIG. 13.

At 904, the UE may receive, responsive to the relay request, via the sidelink, an indication of availability from one or more relay devices, such as described in connection with FIGS. 6 to 8. The relay device may include another UE (e.g., a relay UE) that is capable of communicating with the UE via sidelink and communicating with a base station, e.g., using a Uu interface. In some examples, the UE may be in an RRC connected mode with the base station, and may also be in an active sidelink mode. In other examples, the UE may receive the indication of availability from the relay device(s) having an active sidelink and being in an RRC inactive mode, e.g., as described in connection with FIG. 6 or 8. The reception of the indication of availability may be performed, e.g., by the relay availability process component 1342 via the reception component 1330 of the apparatus 1302 in FIG. 13.

At 906, the UE may transmit a notification to the base station indicating the availability of the one or more relay devices, such as described in connection with FIGS. 6 to 8. For example, at 616, the remote UE 602 may transmit a relay UE found report to the base station 604. The UE may inform the base station that the UE intends to use a sidelink relay device. The transmission of the notification may be performed, e.g., by the relay availability process component 1342 via the transmission component 1334 of the apparatus 1302 in FIG. 13.

At 908, the remote UE may also send a measurement report including sidelink measurements for the one or more relay devices to the base station, such as described in connection with FIGS. 6-8. For example, at 618, the remote UE 602 may transmit a sidelink measurement report to the base station 604. In one example, the measurement report may be transmitted with the relay UE found report at 906, such that the notification sent at 906 may include the measurement report. The measurement report may include an identifier for each of the one more relay devices (e.g., a UE ID of the relay device). The transmission of the measurement report may be performed, e.g., by the measurement report component 1348 via the transmission component 1334 of the apparatus 1302 in FIG. 13.

In some examples, as illustrated at 910, the UE may negotiate with the relay device over the sidelink to establish the relay device for relaying the communication between the UE and the base station, such as described in connection with 614 and 714 of FIGS. 6 and 7 respectively.

At 912, the UE may receive a configuration from the base station for sidelink communication with a relay device from the one or more relay devices, such as described in connection with FIGS. 6 to 8. For example, at 627, the remote UE 602 may receive a configuration for a dedicated sidelink with the relay UE 606 from the base station 604. As such, the sidelink communication between the UE and the relay device may enable communication between the UE and the base station via the relay device. The reception of the configuration for sidelink communication with a relay device may be performed, e.g., by the relay communication configuration component 1344 via the reception component 1330 of the apparatus 1302 in FIG. 13.

Each block in the aforementioned flowchart of FIG. 9 and aspects performed by the UE 602, 702, 802 in FIGS. 6 to 8 may be performed by at least one component of a wireless apparatus, each component being one or more hardware components specifically configured to carry out the stated processes/algorithm, implemented by a processor configured to perform the stated processes/algorithm, stored within a computer-readable medium for implementation by a processor, or some combination thereof. The components may be software components running in a processor, resident/stored in the computer readable medium/memory, one or more hardware components coupled to the processor, or some combination thereof. The processing system may be a component of the UE 350 and may include the memory 360 and/or at least one of the TX processor 368, the RX processor 356, and the controller/processor 359. Alternatively, the processing system may be the entire UE (e.g., see UE 350 of FIG. 3).

In one configuration, an apparatus for wireless communication at UE may include means for transmitting a relay request via sidelink; means for receiving, responsive to the relay request, via the sidelink, an indication of availability from one or more relay devices including the relay device; means for transmitting a notification to the base station of the availability of the one or more relay devices; and means for receiving a configuration from the base station for sidelink communication with a relay device from the one or more relay devices, the sidelink communication between the UE and the relay device enabling communication between the UE and the base station via the relay device, e.g., as described in connection with FIGS. 6-8. The apparatus may further include means for sending a measurement report comprising sidelink measurements for the one or more relay devices to the base station. The apparatus may further include means for negotiating with the relay device over the sidelink to establish the relay device for relaying the communication between the UE and the base station. The aforementioned means may be one or more of the aforementioned components of the apparatus and/or the processing system of the apparatus may be configured to perform the functions recited by the aforementioned means. The processing system may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
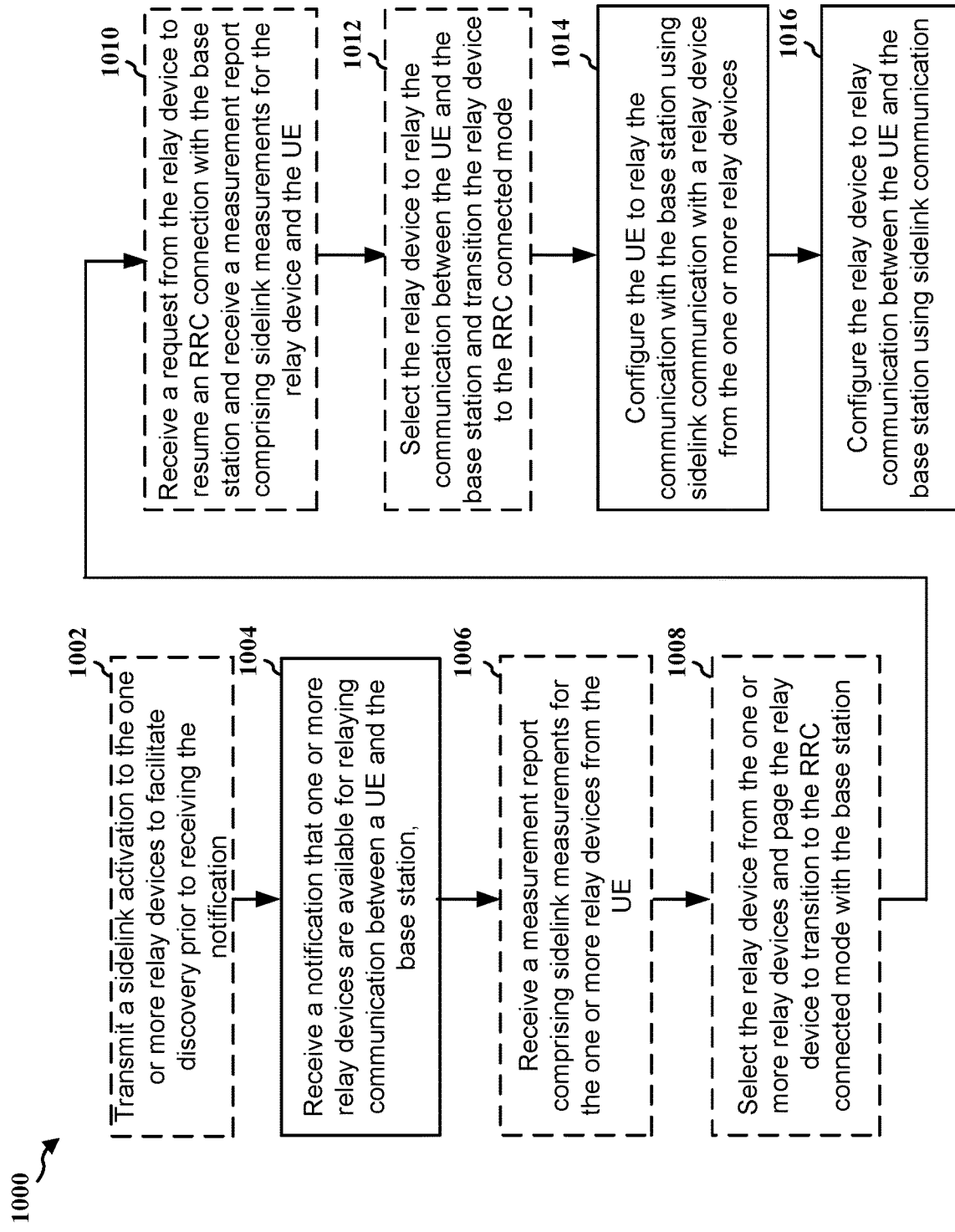
FIG. 10 is a flowchart of a method of wireless communication in accordance with aspects presented herein.

FIG. 10 is a flowchart 1000 of a method of wireless communication. The method may be performed by a base station or a component of a base station (e.g., the base station 102, 180, 310, 404, 504, 604, 704, 804; the processing system, which may include the memory 376 and which may be the entire base station 310 or a component of the base station 310, such as the TX processor 316, the RX processor 370, and/or the controller/processor 375). Optional aspects are illustrated with a dashed line. The method may enable the base station to configure sidelink relay operation and traffics for UE(s).

At 1004, the base station may receive a notification that one or more relay devices are available for relaying communication between a UE and the base station, such as described in connection with FIGS. 6 to 8. For example, at 616, the base station 604 may receive a relay UE found report from the remote UE 602. The UE may be in an RRC connected mode with the base station. The one or more relay devices may be in an RRC inactive mode with the base station, where the one or more relay devices are in the RRC inactive mode, for example, at the time the remote UE 602 searched for the one or more relay devices and generated the relay UE found report. As described in connection with any of FIGS. 6-8, the notification may be received from the UE, or it may be received from the relay device. The reception of the notification may be performed, e.g., by the relay notification process component 1540 via the reception component 1530 of the apparatus 1502 in FIG. 15.

At 1006, the base station may receive a measurement report including sidelink measurements for the one or more relay devices from the UE, such as described in connection with FIGS. 6 to 8. For example, at 618, the base station 604 may receive a sidelink measurement report from the remote UE 602. Although the measurement report is illustrated separately from the notification received at 1004, in some examples, the notification may include the measurement report or may correspond to the measurement report. The measurement report may include an identifier for each of the one more relay devices. The reception of the measurement report may be performed, e.g., by the measurement report process component 1544 via the reception component 1530 of the apparatus 1502 in FIG. 15.

At 1008, the base station may select the relay device from the one or more relay devices, and the base station may page the relay device to transition to the RRC connected mode with the base station, such as described in connection with FIGS. 6-8. For example, at 620, the base station base may perform a relay UE selection and select the relay UE 606 for relaying. At 622, the base station may transmit wake up pages to the relay UE 606 to transition the relay UE 606 into an RRC connected state with the base station 604. The selection of the relay device may be performed, e.g., by the relay configuration component 1542 of the apparatus 1502 in FIG. 15.

At 1010, the base station may receive a request from the relay device to resume an RRC connection with the base station and receive a measurement report comprising sidelink measurements for the relay device and the UE, such as described in connection with FIG. 7 or 8. For example, at 717 and 718, the base station 704 may receive a remote UE request for relay and/or a sidelink measurement report from the relay UE 706. The reception of the request may be performed, e.g., by the reception component 1530 of the apparatus 1502 in FIG. 15.

At 1012, the base station may select the relay device to relay the communication between the UE and the base station and transition the relay device to the RRC connected mode, as described in connection with FIGS. 6-8. The selection of the relay device may be performed, e.g., by the relay configuration component 1542 of the apparatus 1502 in FIG. 15.

At 1014, the base station may configure the UE to relay the communication with the base station using sidelink communication with a relay device from the one or more relay devices, such as described in connection with FIGS. 6-8. At 1016, the base station may configure the relay device to relay communication between the UE and the base station using sidelink communication, e.g., as described in connection with FIGS. 6-8. For example, at 626 and 627, the base station 604 may configure a dedicated sidelink channel for the remote UE 602 and the relay UE 606, such that the remote UE 602 may relay the communication to the base station 604 via the relay UE 606. The configuration for the relay may be performed, e.g., by the relay configuration component 1542 via the transmission component 1534 of the apparatus 1502 in FIG. 15.

In some examples, as shown at 1002, if the one or more relay devices are not active on sidelink, the base station may transmit a sidelink activation to the one or more relay devices to facilitate discovery prior to receiving the notification, e.g., as described in connection with FIG. 8.

Each block in the aforementioned flowchart of FIG. 10 and aspects performed by the base station 604, 704, 804 in FIGS. 6-8 may be performed by at least one component of an apparatus, each component being one or more hardware components specifically configured to carry out the stated processes/algorithm, implemented by a processor configured to perform the stated processes/algorithm, stored within a computer-readable medium for implementation by a processor, or some combination thereof.

The components may be software components running in a processor, resident/stored in the computer readable medium/memory, one or more hardware components coupled to the processor, or some combination thereof. The system may be a component of the base station 310 and may include the memory 376 and/or at least one of the TX processor 316, the RX processor 370, and the controller/processor 375. Alternatively, the processing system may be the entire base station (e.g., see base station 310 of FIG. 3).

In one configuration, an apparatus for wireless communication at a base station may include means for receiving a notification that one or more relay devices are available for relaying communication between a UE and the base station; means for configuring the UE to relay the communication with the base station using sidelink communication with a relay device from the one or more relay devices; and means for configuring the relay device to relay communication between the UE and the base station using sidelink communication. The apparatus may further include means for receiving a measurement report comprising sidelink measurements for the one or more relay devices from the UE. The apparatus may further include means for selecting the relay device from the one or more relay devices; and means for paging the relay device to transition to the RRC connected mode with the base station. The apparatus may further include means for receiving a request from the relay device to resume an RRC connection with the base station; and means for receiving a measurement report comprising sidelink measurements for the relay device and the UE. The apparatus may further include means for selecting the relay device to relay the communication between the UE and the base station; and means for transitioning the relay device to the RRC connected mode. The apparatus may further include means for transmitting a sidelink activation to the one or more relay devices to facilitate discovery prior to receiving the notification.

The aforementioned means may be one or more of the aforementioned components of the apparatus and/or the processing system of the apparatus configured to perform the functions recited by the aforementioned means. As described supra, the processing system may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
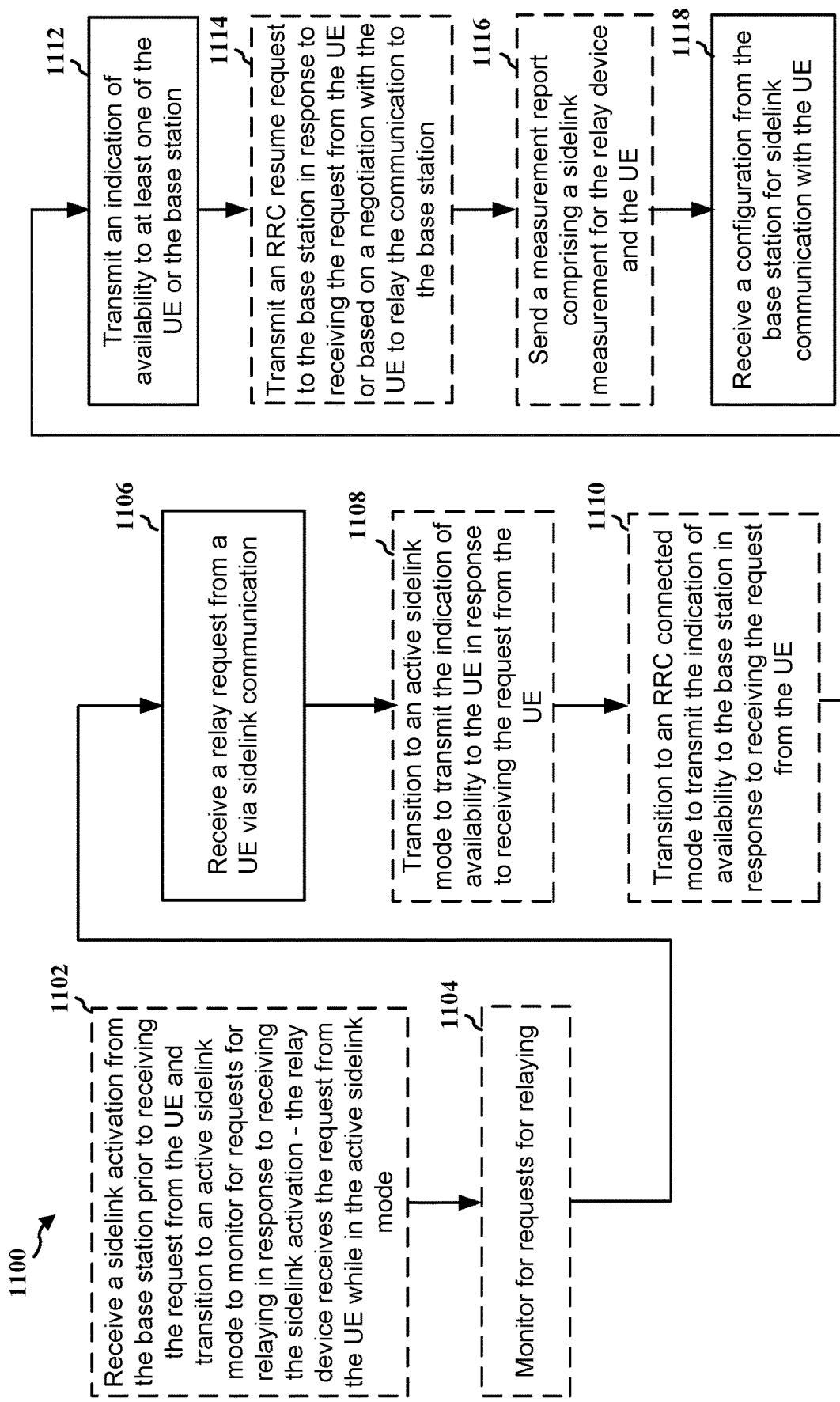
FIG. 11 is a flowchart of a method of wireless communication in accordance with aspects presented herein.

FIG. 11 is a flowchart 1100 of a method of wireless communication. The method may be performed by a relay device or a component of a relay device (e.g., the relay UE 106, 350, 406, 506, 606, 706, 806; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable a relay device that is not connected to the base station to receive a configuration to relay communication between a remote UE and the base station using sidelink communication.

At 1106, the relay device may receive a request from a UE via sidelink for relaying communication between the UE and a base station, such as described in connection with FIGS. 6 to 8. For example, at 613, the relay UE 606 may receive a relay solicitation request from the remote UE 602. The relay device may include another UE such as the relay UE. In one example, the relay device may be in an RRC inactive mode, where the relay device may broadcast the indication of availability over the sidelink. The relay device may remain in the RRC inactive mode until the base station indicates to the relay device to transition to an RRC connected mode, e.g., as described in connection with FIGS. 6-8. In another example, the relay device may be in an active sidelink mode, e.g., as described in connection with FIG. 6 or 7, or it may be in an inactive sidelink mode, e.g., as described in connection with FIG. 8. The reception of the relay request may be performed, e.g., by the relay request process component 1340 via the reception component 1330 of the apparatus 1302 in FIG. 13.

In some examples, as shown at 1102, the relay device may receive a sidelink activation from the base station prior to receiving the request from the UE and may transition to an active sidelink mode to monitor for requests for relaying in response to receiving the sidelink activation, such as described in connection with 840 of FIG. 8. The relay device may receive the request from the UE while in the active sidelink mode. Thus, the base station may trigger the relay device to monitor for such requests from UEs.

At 1104, the relay device may monitor for requests for relaying from nearby UEs, such as described in connection with FIGS. 6 to 8. For example, at 834, the relay UE 806 may monitor and detect relay request from nearby UE(s). In some examples, the relay device may be in an active sidelink mode and may monitor for such requests using a set of monitoring occasions. In other examples, the relay device may be in an inactive sidelink mode and may monitor for the requests at a reduced number of monitoring occasions compared to the active sidelink mode, e.g., as described in connection with FIG. 8. The monitoring of the relay request may be performed, e.g., by the relay request process component 1340 via the reception component 1330 of the apparatus 1302 in FIG. 13.

At 1106, the relay device may receive a relay request from a UE via sidelink. The relay request may request a device capable of relaying communication between the UE and a base station, such as described in connection with FIGS. 6 to 8. For example, at 613, the relay UE 606 may receive a relay solicitation request from the remote UE 602. The reception of the relay request may be performed, e.g., by the relay request process component 1340 via the reception component 1330 of the apparatus 1302 in FIG. 13.

In some examples, as illustrated at 1108, the relay device may transition to an active sidelink mode to transmit the indication of availability to the UE in response to receiving the request from the UE, e.g., as described in connection with FIG. 8.

In some examples, as illustrated at 1110, the relay device may transition to an RRC connected mode to transmit the indication of availability to the base station in response to receiving the request from the UE, e.g., as described in connection with FIG. 8. In other examples, the relay device may remain in the RRC inactive mode until the base station indicates to the relay device to transition to an RRC connected mode, e.g., as described in connection with FIGS. 6-8.

At 1112, the relay device may transmit, responsive to receiving the relay request at 1106, an indication of availability to at least one of the UE or the base station, such as described in connection with FIGS. 6 and 7. For example, at 612, the relay UE 606 may broadcast its availabilities for relaying to nearby UE(s), which includes the remote UE 602. In some examples, the relay device may transmit the indication of availability to the base station, e.g., as described in connection with FIG. 7 or 8. The relay device may transition to the RRC connected mode to transmit the indication in some examples. The relay device may transmit the indication to the UE, e.g., using sidelink communication. For example, the relay device may broadcast an indication of its availability over sidelink. The transmission of the indication of availability may be performed, e.g., by the relay availability process component 1342 via the transmission component 1334 of the apparatus 1302 in FIG. 13.

At 1114, the relay device may transmit an RRC resume request to the base station in response to receiving the request from the UE or based on a negotiation with the UE to relay the communication to the base station, e.g., as described in connection with FIG. 7 or 8. Although the RRC resume request, at 1114, is illustrated separately from the indication, at 1112, the indication may be comprised in the RRC resume request in some examples. The transmission of the RRC request may be performed, e.g., by the relay request process component 1340 and/or the negotiation component 1346 via the transmission component 1334 of the apparatus 1302 in FIG. 13.

At 1116, the relay device may send a measurement report including a sidelink measurement for the relay device and the UE. Although the measurement report, at 1116, is illustrated separately from the indication, at 1112, the measurement report may be transmitted together with the indication, at 1112, or may correspond to the indication, in some examples. The transmission of the measurement report may be performed, e.g., by the measurement report component 1348 via the transmission component 1334 of the apparatus 1302 in FIG. 13.

At 1118, the relay device may receive a configuration from the base station for sidelink communication with the UE, such as described in connection with FIGS. 6 to 8. For example, at 626, the relay UE 606 may receive a configuration for a dedicated sidelink channel from the base station, where the dedicated sidelink channel may be used by the relay UE 606 for communicating with the remote UE 602. The sidelink communication between the UE and the relay device may enable communication between the UE and the base station, e.g., as described in connection with FIGS. 6-8. The configuration may be to relay uplink and/or downlink communication between the UE and the base station including receiving and/or transmitting communication to the UE using the sidelink configuration. The reception of the configuration for the sidelink communication with the UE may be performed, e.g., by the relay communication configuration component 1344 via the reception component 1330 of the apparatus 1302 in FIG. 13.

In one configuration, an apparatus for wireless communication at a base station may include means for receiving a request from a UE via sidelink for relaying communication between the UE and a base station; means for transmitting an indication of availability to at least one of the UE or the base station; and means for receiving a configuration from the base station for sidelink communication with the UE to relay the communication between the UE and the base station. The apparatus may further include means for transmitting an RRC resume request to the base station in response to receiving the request from the UE or based on a negotiation with the UE to relay the communication to the base station. The apparatus may further include means for sending a measurement report comprising a sidelink measurement for the relay device and the UE. The apparatus may further include means for monitoring for requests for relaying at a reduced number of monitoring occasions compared to an active sidelink mode. The apparatus may further include means for transitioning to an RRC connected mode to transmit the indication of availability to the base station in response to receiving the request from the UE. The apparatus may further include means for transitioning to an active sidelink mode to transmit the indication of availability to the UE in response to receiving the request from the UE. The apparatus may further include means for receiving a sidelink activation from the base station prior to receiving the request from the UE; and transitioning to an active sidelink mode to monitor for requests for relaying in response to receiving the sidelink activation, wherein the relay device receives the request from the UE while in the active sidelink mode.

The aforementioned means may be one or more of the aforementioned components of the apparatus and/or the processing system of the apparatus configured to perform the functions recited by the aforementioned means. As described supra, the processing system may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
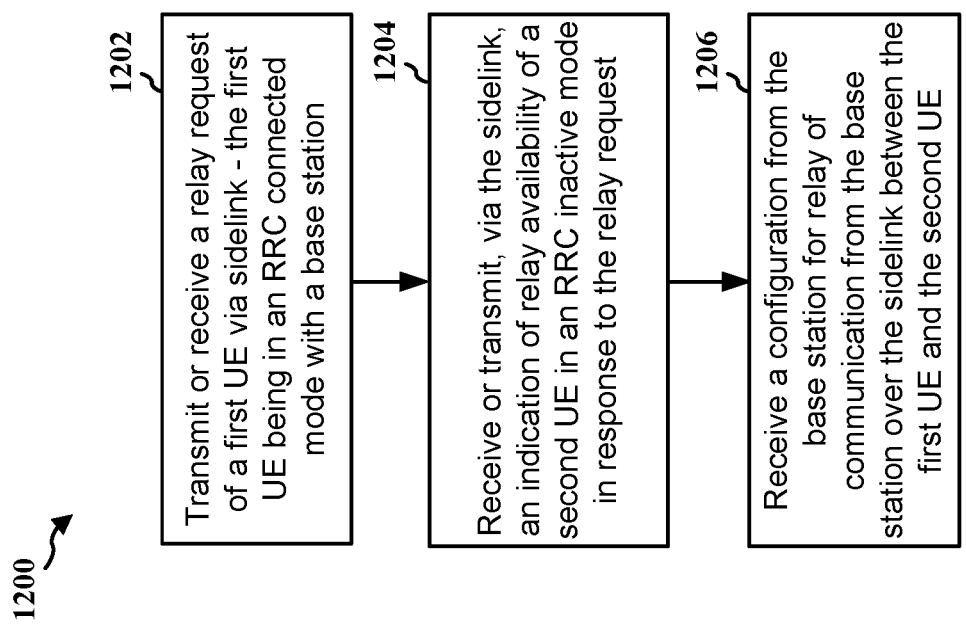
FIG. 12 is a flowchart of a method of wireless communication in accordance with aspects presented herein.

FIG. 12 is a flowchart 1200 of a method of wireless communication. The method may be performed by a UE or a component of a UE (e.g., the UE 104, 350, 402, 502, 602, 702, 802; the relay UE 106, 350, 406, 506, 606, 706, 806; the apparatus 1302; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to notify a base station about the availability of a relay UE that is not connected to the base station. The method may also enable the UE that is not connected to the base station to receive a configuration to relay communication between a remote UE and the base station using sidelink communication.

At 1202, the UE may transmit or receive a relay request of a first UE via sidelink, the first UE may be in an RRC connected mode with a base station, such as described in connection with FIGS. 6 to 8. For example, at 610, the remote UE 602 may be RRC connected to the base station 604, and at 612 and 613, the remote UE 602 may transmit a relay request to the relay UE 606. The transmission and/or reception of the relay request may be performed, e.g., by the relay request process component 1340, the reception component 1330, and/or the transmission component 1334 of the apparatus 1302 in FIG. 13. For example, the UE transmitting or receiving at 1202 may be the first UE, which transmits the relay request, as described in connection with 902 in FIG. 9. The UE transmitting or receiving at 1202 may be a second UE that receives the relay request, as described in connection with 1106 in FIG. 11.

At 1204, the first UE or the second UE may receive or transmit, via the sidelink, an indication of relay availability of a second UE in an RRC inactive mode in response to the relay request, such as described in connection with FIGS. 6 to 8. For example, the UE transmitting or receiving at 1204 may be the first UE, which receives the indication of relay availability for the second UE, as described in connection with 904 in FIG. 9. The UE transmitting or receiving at 1204 may be a second UE that transmits the indication of relay availability, as described in connection with 1112 in FIG. 11. For example, at 612, the remote UE 602 may receive a discovery message from the relay UE 606 that indicates the relay UE 606's relay availability, where the relay UE 606 may be in an RRC inactive mode (at the time the relay UE 606 transmits the discovery message), such as shown at 608. The transmission and/or reception of the indication may be performed, e.g., by the relay availability process component 1342, the reception component 1330, and/or the transmission component 1334 of the apparatus 1302 in FIG. 13.

In one example, as discussed in connection with the flowchart of FIG. 9, the method may be performed by the first UE (e.g., a remote UE) that transmits the relay request and receives the indication of relay availability from one or more relay devices including the second UE, such as described in connection with FIGS. 6 to 9. In other words, the transmitting or receiving the relay request of the first UE may include transmitting, by the first UE, the relay request of the first UE, and receiving or transmitting the indication of relay availability of the second UE may include receiving, by the first UE, the indication of relay availability from one or more relay devices including the second UE, and receiving the configuration from the base station for relay of communication from the base station may include receiving, by the first UE, the configuration from the base station for sidelink communication with the second UE to enable relayed communication between the first UE and the base station via the second UE, and transmitting, by the first UE, a notification to the base station of the relay availability of the one or more relay devices. In such an example, the first UE may transmit a notification to the base station of the relay availability of the one or more relay devices, where the first UE may receive the configuration from the base station for sidelink communication with the second UE, the sidelink communication between the first UE and the second UE to enable relayed communication between the first UE and the base station via the second UE. The transmission of the notification may be performed, e.g., by the transmission component 1334 of the apparatus 1302 in FIG. 13. In such an example, the first UE may send a measurement report comprising sidelink measurements for the one or more relay devices to the base station, where the measurement report may include an identifier for each of the one or more relay devices. In another example, the first UE may negotiate with the second UE over the sidelink to establish the relay device for relaying the communication between the first UE and the base station. The negotiation may be performed, e.g., by the negotiation component 1346, the reception component 1330, and/or the transmission component 1334 of the apparatus 1302 in FIG. 13.

In another example, as discussed in connection with flowchart 1100 of FIG. 11, the method may be performed by the second UE that receives the relay request from the first UE and transmits the indication of relay availability to the first UE or the base station, where the configuration from the base station to the second UE is for sidelink communication with the first UE, the sidelink communication between the first UE and the second UE enabling relayed communication between the first UE and the base station. In other words, transmitting or receiving the relay request of the first UE may include receiving, by the second UE, the relay request of the first UE, and receiving or transmitting the indication of relay availability of the second UE may include transmitting to the first UE or the base station, by the second UE, the indication of relay availability, and receiving the configuration from the base station for relay of communication from the base station may include receiving, by the second UE, the configuration from the base station for sidelink communication with the first UE to enable the second UE to serve as a relay for relayed communication between the first UE and the base station. In such an example, the second UE may include a mobile UE or a stationary UE. In such an example, the transmitting the indication of relay availability may further include broadcasting the indication of relay availability over the sidelink by the second UE.

In one example, the second UE may remain in the RRC inactive mode until receiving a transition indication from the base station to transition to an RRC connected mode, such as described in connection with FIGS. 6 to 8.

In another example, the second UE may transmit the indication of relay availability to the base station, such as described in connection with FIGS. 7 and 8. For example, the second UE may transmit an RRC resume request to the base station in response to receiving the relay request from the first UE or based on a negotiation with the first UE to relay the communication to the base station. In another example, the second UE may send a measurement report comprising a sidelink measurement between the second UE and the first UE.

In one example, the second UE may receive the relay request while in an active sidelink mode.

In another example, the second UE may receive the relay request while in an inactive sidelink mode. In such an example, the second UE may monitor for requests for relaying at a reduced number of monitoring occasions compared to an active sidelink mode. In such an example, the second UE may transition to the RRC connected mode to transmit the indication of relay availability to the base station in response to receiving the relay request from the first UE. In such an example, the second UE may transitioning to the active sidelink mode to transmit the indication of relay availability to the first UE in response to receiving the relay request from the first UE.

In another example, the second UE may receive a sidelink activation from the base station prior to receiving the relay request from the first UE, and the second UE may transition to an active sidelink mode to monitor for requests for relaying in response to receiving the sidelink activation, wherein the second UE receives the relay request from the first UE while in the active sidelink mode.

At 1206, the first UE and the second UE may receive a configuration from the base station for relay of communication from the base station over the sidelink between the first UE and the second UE, such as described in connection with FIGS. 6 to 8. The reception of the configuration may correspond to 912 or 1118, for example. For example, at 626 and 627, the relay UE 606 and the remote UE 602 may receive a configuration for dedicated sidelink channel from the base station 604, where the relay UE 606 and the remote UE 602 may communicate with each other over the dedicated sidelink channel. The reception of the configuration may be performed, e.g., by the relay communication configuration component 1344 and/or the reception component 1330 of the apparatus 1302 in FIG. 13.

Figure 13:
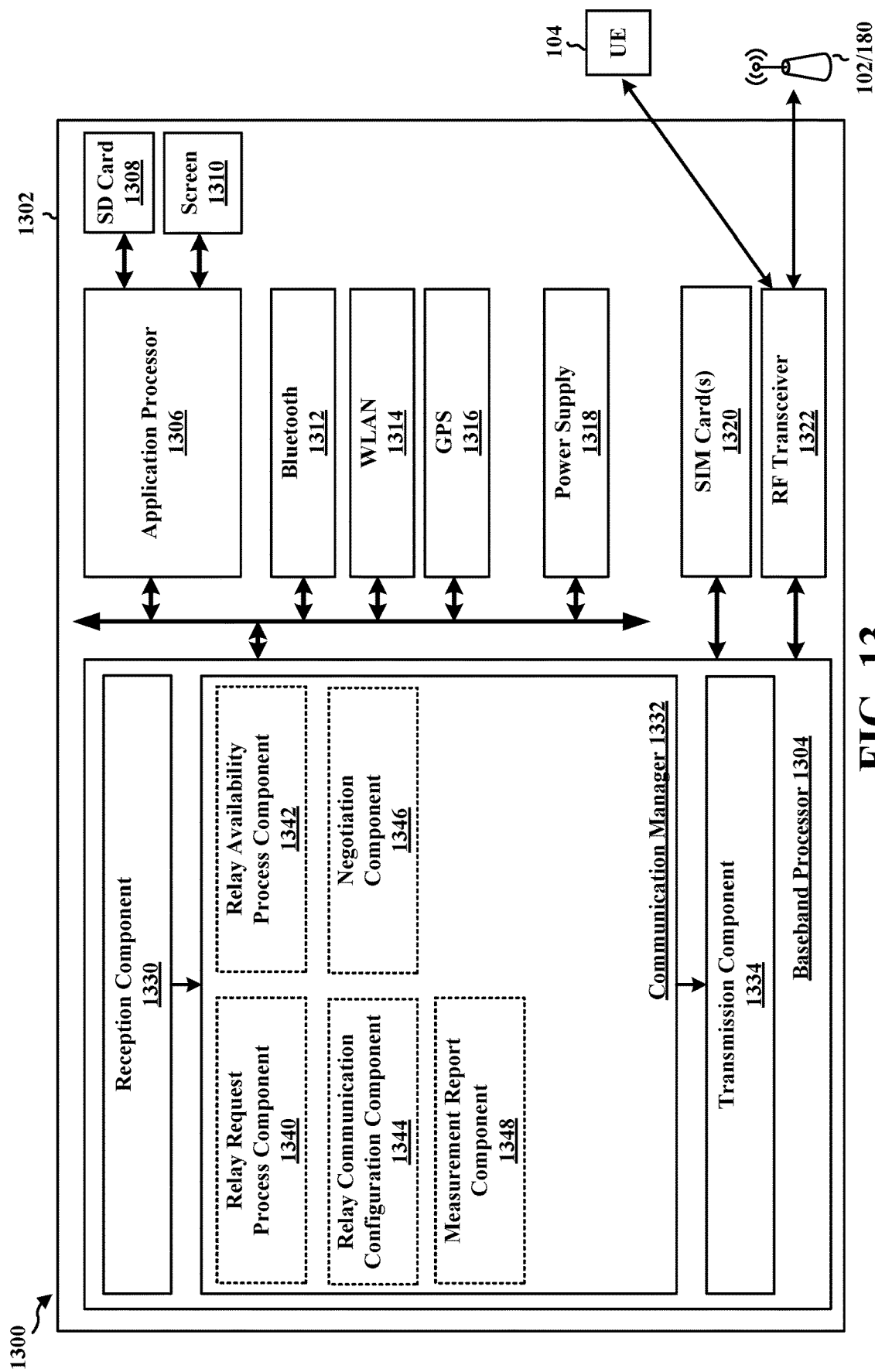
FIG. 13 is a diagram illustrating an example of a hardware implementation for an example apparatus in accordance with aspects presented herein.

FIG. 13 is a diagram 1300 illustrating an example of a hardware implementation for an apparatus 1302. The apparatus 1302 may be a UE or another relay device. The apparatus 1302 may be a mobile UE or a stationary UE, in some aspects. The apparatus may be configured to perform the aspects described in connection with FIGS. 9 and/or 11. In some aspects, the apparatus 1302 may be configured to provide a relay service, as described in connection with FIG. 11. In other aspects, the apparatus 1302 may be configured to request relay by another device, as described in connection with FIG. 9. The apparatus includes a baseband processor 1304 (also referred to as a modem) coupled to a RF transceiver 1322 and one or more subscriber identity modules (SIM) cards 1320, an application processor 1306 coupled to a secure digital (SD) card 1308. In some aspects, the baseband processor 1304 may be a cellular baseband processor, and the RF transceiver may be a cellular RF transceiver. The apparatus may further include a screen 1310, a Bluetooth module 1312, a wireless local area network (WLAN) module 1314, a Global Positioning System (GPS) module 1316, and/or a power supply 1318. The baseband processor 1304 communicates through the RF transceiver 1322 with the UE 104 and/or BS 102/180. The baseband processor 1304 may include a computer-readable medium/memory. The computer-readable medium/memory may be non-transitory. The baseband processor 1304 is responsible for general processing, including the execution of software stored on the computer-readable medium/memory. The software, when executed by the baseband processor 1304, causes the baseband processor 1304 to perform the various functions described herein. The computer-readable medium/memory may also be used for storing data that is manipulated by the baseband processor 1304 when executing software. The baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband processor 1304. The baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see UE 350 of FIG. 3) and include the additional modules of the apparatus 1302.

The communication manager 1332 includes a relay request process component 1340 that is configured to transmit or receive a relay request of a first UE via sidelink, the first UE may be in an RRC connected mode with a base station, e.g., as described in connection with 1202 of FIG. 12. The communication manager 1332 further includes a relay availability process component 1342 that is configured to receive or transmit, via the sidelink, an indication of relay availability of a second UE in an RRC inactive mode in response to the relay request, e.g., as described in connection with 1204 of FIG. 12. The communication manager 1332 further includes a relay communication configuration component 1344 that is configured to receive a configuration from the base station for relay of communication from the base station over the sidelink between the first UE and the second UE, e.g., as described in connection with 1206 of FIG. 12.

The apparatus may include additional components that perform each of the blocks of the algorithm in the aforementioned flowcharts of FIGS. 9, 11 and 12. As such, each block in the flowcharts of FIGS. 9, 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband processor 1304, includes means for transmitting or receiving a relay request of a first UE via sidelink, the first UE may be in an RRC connected mode with a base station (e.g., the relay request process component 1340, the reception component 1330, and/or the transmission component 1334). The apparatus 1302 includes means for receiving or transmitting, via the sidelink, an indication of relay availability of a second UE in an RRC inactive mode in response to the relay request (e.g., the relay availability process component 1342, the reception component 1330, and/or the transmission component 1334). The apparatus 1302 includes means for receiving a configuration from the base station for relay of communication from the base station over the sidelink between the first UE and the second UE (e.g., the relay communication configuration component 1344 and/or the reception component 1330).

The aforementioned means may be one or more of the components of the apparatus 1302 configured to perform the functions recited by the aforementioned means. The apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
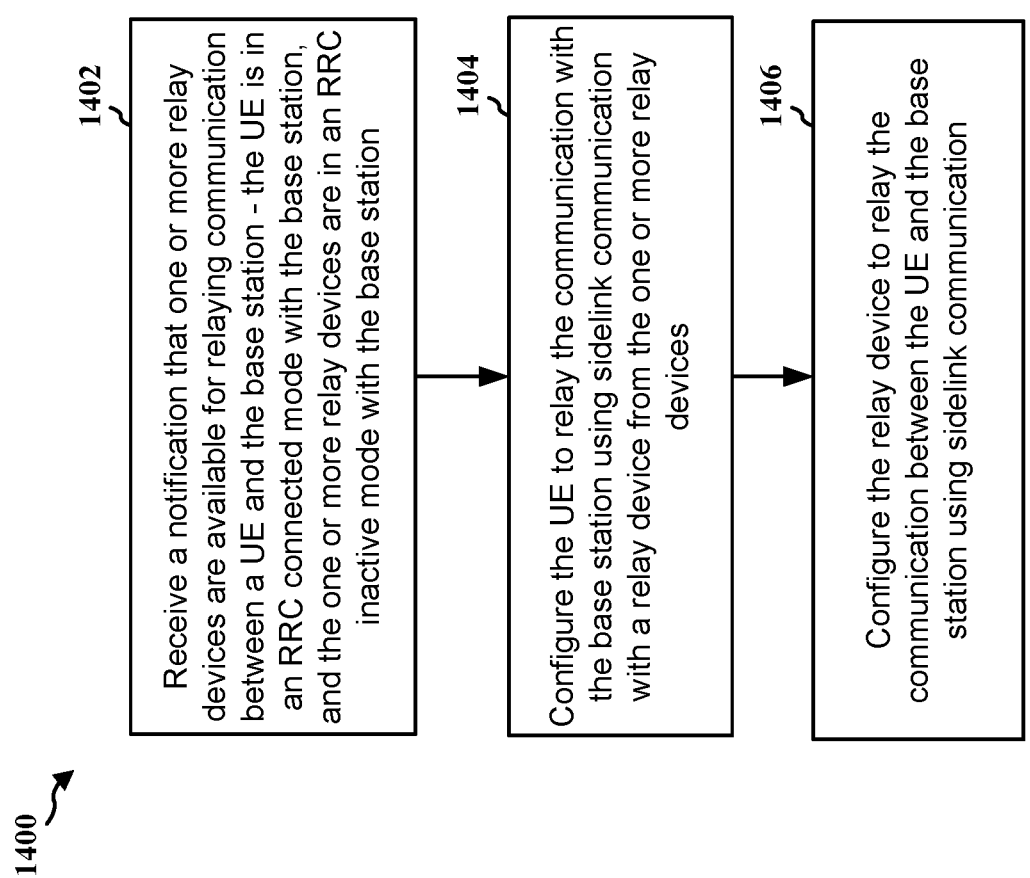
FIG. 14 is a flowchart of a method of wireless communication in accordance with aspects presented herein.

FIG. 14 is a flowchart 1400 of a method of wireless communication. The method may be performed by a base station or a component of a base station (e.g., the base station 102, 180, 310, 404, 504, 604, 704, 804; the apparatus 1502; a processing system, which may include the memory 376 and which may be the entire base station 310 or a component of the base station 310, such as the TX processor 316, the RX processor 370, and/or the controller/processor 375). Optional aspects are illustrated with a dashed line. The method may enable a base station to configure sidelink relay operation and traffics for UE(s).

At 1402, the base station may receive a notification that one or more relay devices are available for relaying communication between a UE and the base station, where the UE is in an RRC connected mode with the base station, and where the one or more relay devices are in an RRC inactive mode with the base station, such as described in connection with FIGS. 6 to 8. For example, at 616, the base station 604 may receive an indication from the remote UE 602 indicating that the relay UE 606 is available for relaying communication between the remote UE 602 and the base station 604. The reception of the notification may be performed, e.g., by the relay notification process component 1540 and/or the reception component 1530 of the apparatus 1502 in FIG. 15.

In one example, the notification may be received from the UE. In such an example, the base station may receive a measurement report comprising sidelink measurements for the one or more relay devices from the UE, such as described in connection with 616 and 618 of FIG. 6. In such an example, the measurement report may include an identifier for each of the one more relay devices. In such an example, the base station may select the relay device from the one or more relay devices, and the base station may page the relay device to transition to the RRC connected mode with the base station, such as described in connection with 620 and 622 of FIG. 6.

In another example, the notification may be received from the relay device. In such an example, the base station may receive a request from the relay device to resume an RRC connection with the base station, and the base station may receive a measurement report comprising sidelink measurements for the relay device and the UE, such as described in connection with 717 and 718 of FIG. 7. In such an example, the base station may select the relay device to relay the communication between the UE and the base station, and the base station may transition the relay device to the RRC connected mode, such as described in connection with 722 and 724 of FIG. 7.

In another example, the base station may transmit a sidelink activation to the one or more relay devices to facilitate discovery prior to receiving the notification, such as described in connection with 840 of FIG. 8.

At 1404, the base station may configure the UE to relay the communication with the base station using sidelink communication with a relay device from the one or more relay devices, such as described in connection with FIGS. 6 to 8. For example, at 626 and 627, the base station 604 may configure a dedicated sidelink channel between the remote UE 602 and the relay UE 606, such that the remote UE 602 may communicate with the base station 604 via the relay UE 606, such as shown at 628 and 630. The configuration may be performed, e.g., by the relay configuration component 1542, the reception component 1530, and/or the transmission component 1534 of the apparatus 1502 in FIG. 15.

At 1406, the base station may configure the relay device to relay the communication between the UE and the base station using sidelink communication, such as described in connection with FIGS. 6 to 8. For example, at 626 and 627, the base station 604 may configure a dedicated sidelink channel between the remote UE 602 and the relay UE 606, such that the remote UE 602 may communicate with the base station 604 via the relay UE 606, such as shown at 628 and 630. The configuration may be performed, e.g., by the relay configuration component 1542, the reception component 1530, and/or the transmission component 1534 of the apparatus 1502 in FIG. 15.

Figure 15:
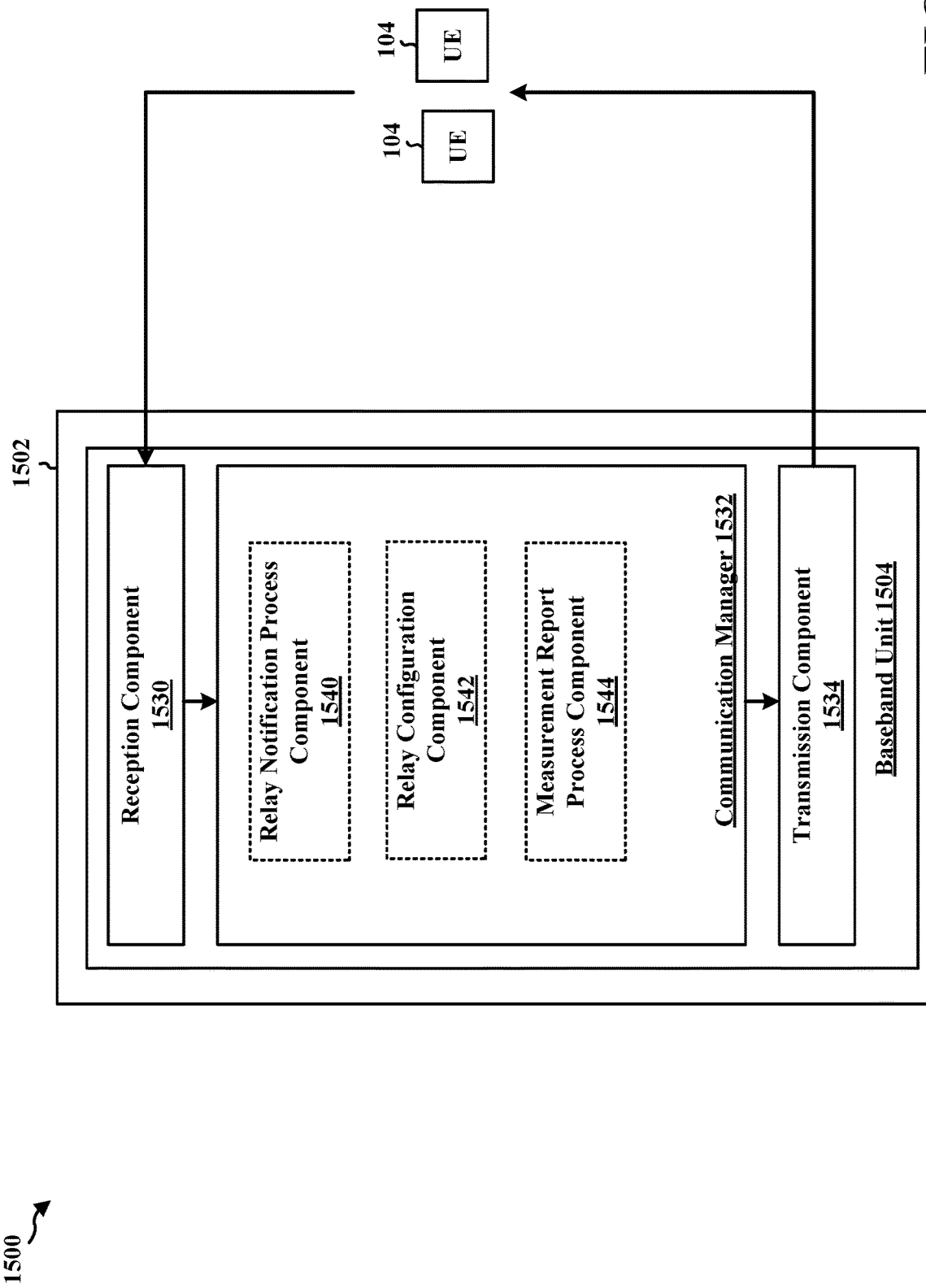
FIG. 15 is a diagram illustrating an example of a hardware implementation for an example apparatus in accordance with aspects presented herein.

FIG. 15 is a diagram 1500 illustrating an example of a hardware implementation for an apparatus 1502. The apparatus 1502 is a BS and includes a baseband unit 1504. The baseband unit 1504 may communicate through a RF transceiver with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described herein. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a relay notification process component 1540 that is configured to receive a notification that one or more relay devices are available for relaying communication between a UE and the base station, where the UE is in an RRC connected mode with the base station, and where the one or more relay devices are in an RRC inactive mode with the base station, e.g., as described in connection with 1402 of FIG. 14. The communication manager 1532 further includes a relay configuration component 1542 that is configured to configure the UE to relay the communication with the base station using sidelink communication with a relay device from the one or more relay devices, e.g., as described in connection with 1404 of FIG. 14. The relay configuration component 1542 may also be configured to configure the relay device to relay the communication between the UE and the base station using sidelink, e.g., as described in connection with 1406 of FIG. 14.

The apparatus may include additional components that perform each of the blocks of the algorithm in the flowcharts of FIGS. 10 and 14. As such, each block in the flowcharts of FIGS. 10 and 14 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving a notification that one or more relay devices are available for relaying communication between a UE and the base station, where the UE is in an RRC connected mode with the base station, and where the one or more relay devices are in an RRC inactive mode with the base station (e.g., the relay notification process component 1540 and/or the reception component 1530). The apparatus 1502 includes means for configure the UE to relay the communication with the base station using sidelink communication with a relay device from the one or more relay devices (e.g., the relay configuration component 1542, the reception component 1530, and/or the transmission component 1534). The apparatus 1502 includes means for configuring the relay device to relay the communication between the UE and the base station using sidelink (e.g., the relay configuration component 1542, the reception component 1530, and/or the transmission component 1534).

The aforementioned means may be one or more of the aforementioned components of the apparatus 1502 configured to perform the functions recited by the means. As described herein, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

The following examples set forth additional aspects and are illustrative only and aspects thereof may be combined with aspects of other examples or teaching described herein, without limitation.

Aspect 1 is a method of wireless communication at a UE, comprising: transmitting a request via sidelink for relaying communication between the UE and a base station; receiving, via the sidelink, an indication of availability from one or more relay devices including the relay device; transmitting a notification to the base station of the availability of the one or more relay devices; and receiving a configuration from the base station for sidelink communication with a relay device to relay the communication between the UE and the base station.

In aspect 2, the method of aspect 1 further includes that the relay device comprises another UE.

In aspect 3, the method of aspect 1 or aspect 2 further includes that the UE is in an RRC connected mode with the base station, and where the UE receives the indication of availability from the one or more relay devices having an active sidelink and being in an RRC inactive mode.

In aspect 4, the method of any of aspects 1-3 further comprises sending a measurement report comprising sidelink measurements for the one or more relay devices to the base station.

In aspect 5, the method of any of aspects 1-4 further includes that the notification comprises the measurement report.

In aspect 6, the method of any of aspects 1-5 further includes that the measurement report includes an identifier for each of the one more relay devices.

In aspect 7, the method of any of aspects 1-6 further comprises negotiating with the relay device over the sidelink to establish the relay device for relaying the communication to the base station.

Aspect 8 is an apparatus for wireless communication including at least one processor coupled to a memory and configured to implement a method as in any of aspects 1 to 7.

Aspect 9 is an apparatus for wireless communication including means for implementing a method as in any of aspects 1 to 7.

Aspect 10 is a non-transitory computer-readable medium storing computer executable code, where the code when executed by a processor causes the processor to implement a method as in any of aspects 1 to 7.

Aspect 11 is a method of wireless communication at a base station, comprising: receiving a notification that one or more relay devices are available for relaying communication between a UE and the base station, where the UE is in an RRC connected mode with the base station, and where the one or more relay devices are in an RRC inactive mode with the base station; configuring the UE to relay the communication with the base station using sidelink communication with a relay device from the one or more relay devices; and configuring the relay device to relay communication between the UE and the base station using sidelink communication.

In aspect 12, the method of aspect 11 further includes that the notification is received from the UE.

In aspect 13, the method of aspect 11 or aspect 12 further comprises receiving a measurement report comprising sidelink measurements for the one or more relay devices from the UE.

In aspect 14, the method of any of aspects 11-13 further includes that the notification comprises the measurement report.

In aspect 15, the method of any of aspects 11-14 further includes that the measurement report includes an identifier for each of the one more relay devices.

In aspect 16, the method of any of aspects 11-15 further comprises selecting the relay device from the one or more relay devices; and paging the relay device to transition to the RRC connected mode with the base station.

In aspect 17, the method of any of aspects 11-16 further includes that the notification is received from the relay device.

In aspect 18, the method of any of aspects 11-17 further comprises receiving a request from the relay device to resume an RRC connection with the base station; and receiving a measurement report comprising sidelink measurements for the relay device and the UE.

In aspect 19, the method of any of aspects 11-18 further comprises selecting the relay device to relay the communication from the UE to the base station; and transitioning the relay device to the RRC connected mode.

In aspect 20, the method of any of aspects 11-19 further comprises transmitting a sidelink activation to the one or more relay devices to facilitate discovery prior to receiving the notification.

Aspect 21 is an apparatus for wireless communication including at least one processor coupled to a memory and configured to implement a method as in any of aspects 11 to 20.

Aspect 22 is an apparatus for wireless communication including means for implementing a method as in any of aspects 11 to 20.

Aspect 23 is a non-transitory computer-readable medium storing computer executable code, where the code when executed by a processor causes the processor to implement a method as in any of aspects 11 to 20.

Aspect 24 is a method of wireless communication at relay device, comprising: receiving a request from a UE via sidelink for relaying communication from the UE to a base station; transmitting an indication of availability to at least one of the UE or the base station; and receiving a configuration from the base station for sidelink communication with the UE to relay the communication from the UE to the base station.

In aspect 25, the method of aspect 24 further includes that the relay device comprises another UE.

In aspect 26, the method of aspect 24 or aspect 25 further includes that the relay device is in an RRC inactive mode, and where the relay device broadcasts the indication of availability over the sidelink.

In aspect 27, the method of any of aspects 24-26 further includes that the relay device remains in the RRC inactive mode until the base station indicates to the relay device to transition to an RRC connected mode.

In aspect 28, the method of any of aspects 24-27 further includes that the relay device transmits the indication of availability to the base station.

In aspect 29, the method of any of aspects 24-28 further comprises transmitting an RRC resume request to the base station in response to receiving the request from the UE or based on a negotiation with the UE to relay the communication to the base station.

In aspect 30, the method of any of aspects 24-29 further comprises sending a measurement report comprising a sidelink measurement for the relay device and the UE.

In aspect 31, the method of any of aspects 24-30 further includes that the indication comprises the measurement report.

In aspect 32, the method of any of aspects 24-31 further includes that the relay device is in an active sidelink mode.

In aspect 33, the method of any of aspects 24-32 further includes that the relay device is in an inactive sidelink mode In aspect 34, the method of any of aspects 24-33 further comprises monitoring for requests for relaying at a reduced number of monitoring occasions compared to an active sidelink mode.

In aspect 35, the method of any of aspects 24-34 further comprises transitioning to an RRC connected mode to transmit the indication of availability to the base station in response to receiving the request from the UE.

In aspect 36, the method of any of aspects 24-35 further comprises transitioning to an active sidelink mode to transmit the indication of availability to the UE in response to receiving the request from the UE.

In aspect 37, the method of any of aspects 24-36 further comprises receiving a sidelink activation from the base station prior to receiving the request from the UE; and transitioning to an active sidelink mode to monitor for requests for relaying in response to receiving the sidelink activation, where the relay device receives the request from the UE while in the active sidelink mode.

Aspect 38 is an apparatus for wireless communication including at least one processor coupled to a memory and configured to implement a method as in any of aspects 24 to 37.

Aspect 39 is an apparatus for wireless communication including means for implementing a method as in any of aspects 24 to 37.

Aspect 40 is a non-transitory computer-readable medium storing computer executable code, where the code when executed by a processor causes the processor to implement a method as in any of aspects 24 to 37.

Aspect 41 is a method of wireless communication, comprising: transmitting or receiving a relay request of a first UE via sidelink, the first UE being in an RRC connected mode with a base station; receiving or transmitting, via the sidelink, an indication of relay availability of a second UE in an RRC inactive mode in response to the relay request; and receiving a configuration from the base station for relay of communication from the base station over the sidelink between the first UE and the second UE.

In aspect 42, the method of aspect 41 further includes that transmitting or receiving the relay request of the first UE comprises transmitting, by the first UE, the relay request of the first UE, receiving or transmitting the indication of relay availability of the second UE comprises receiving, by the first UE, the indication of relay availability from one or more relay devices including the second UE, and receiving the configuration from the base station for relay of communication from the base station comprises receiving, by the first UE, the configuration from the base station for sidelink communication with the second UE to enable relayed communication between the first UE and the base station via the second UE, the method further comprising: transmitting, by the first UE, a notification to the base station of the relay availability of the one or more relay devices.

In aspect 43, the method of aspect 41 or aspect 42 further comprises: sending, by the first UE, a measurement report comprising sidelink measurements for the one or more relay devices to the base station.

In aspect 44, the method of any of aspects 41-43 further includes that the measurement report includes an identifier for each of the one or more relay devices.

In aspect 45, the method of any of aspects 41-44 further comprises: negotiating, by the first UE, with the second UE over the sidelink to establish the relay device for relaying the communication between the first UE and the base station.

In aspect 46, the method of any of aspects 41-45 further includes that transmitting or receiving the relay request of the first UE comprises receiving, by the second UE, the relay request of the first UE, and receiving or transmitting the indication of relay availability of the second UE comprises transmitting to the first UE or the base station, by the second UE, the indication of relay availability, and receiving the configuration from the base station for relay of communication from the base station comprises receiving, by the second UE, the configuration from the base station for sidelink communication with the first UE to enable the second UE to serve as a relay for relayed communication between the first UE and the base station.

In aspect 47, the method of any of aspects 41-46 further includes that the second UE comprises a mobile UE or a stationary UE.

In aspect 48, the method of any of aspects 41-47 further includes that transmitting the indication of relay availability further includes broadcasting the indication of relay availability over the sidelink.

In aspect 49, the method of any of aspects 41-48 further comprises: remaining, by the second UE, in the RRC inactive mode until receiving a transition indication from the base station to transition to an RRC connected mode.

In aspect 50, the method of any of aspects 41-49 further includes that transmitting to the first UE or the base station, by the second UE, the indication of relay availability comprises transmitting the indication of relay availability to the base station.

In aspect 51, the method of any of aspects 41-50 further comprises: transmitting, by the second UE, an RRC resume request to the base station in response to receiving the relay request from the first UE or based on a negotiation with the first UE to relay the communication to the base station.

In aspect 52, the method of any of aspects 41-51 further comprises: sending, by the second UE, a measurement report comprising a sidelink measurement between the second UE and the first UE.

In aspect 53, the method of any of aspects 41-52 further includes that receiving, by the second UE, the relay request comprises receiving the relay request while in an active sidelink mode.

In aspect 54, the method of any of aspects 41-53 further includes that receiving, by the second UE, the relay request comprises receiving the relay request while in an inactive sidelink mode, the method further comprises: monitoring for requests for relaying at a reduced number of monitoring occasions compared to an active sidelink mode.

In aspect 55, the method of any of aspects 41-54 further comprises: transitioning, by the second UE, to the RRC connected mode to transmit the indication of relay availability to the base station in response to receiving the relay request from the first UE.

In aspect 56, the method of any of aspects 41-55 further comprises: transitioning, by the second UE, to the active sidelink mode to transmit the indication of relay availability to the first UE in response to receiving the relay request from the first UE.

In aspect 57, the method of any of aspects 41-56 further comprises: receiving, by the second UE, a sidelink activation from the base station prior to receiving the relay request from the first UE; and transitioning, by the second UE, to an active sidelink mode to monitor for requests for relaying in response to receiving the sidelink activation, where receiving, by the second UE, the relay request from the first UE comprises receiving the relay request from the first UE while in the active sidelink mode.

Aspect 58 is an apparatus for wireless communication including at least one processor coupled to a memory and configured to implement a method as in any of aspects 41 to 57.

Aspect 59 is an apparatus for wireless communication including means for implementing a method as in any of aspects 41 to 57.

Aspect 60 is a non-transitory computer-readable medium storing computer executable code, where the code when executed by a processor causes the processor to implement a method as in any of aspects 41 to 57.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a remote user equipment (UE), comprising:
    transmitting, to a relay UE, a relay request via sidelink, the relay UE being in a radio resource control (RRC) inactive mode;
    receiving, from the relay UE via the sidelink, an indication of relay availability in response to the relay request; and
    receiving, from a base station, a configuration for relay of communication from the base station over the sidelink between the remote UE and the relay UE.

2. The method of claim 1, further comprising:
    transmitting, for the base station, a notification of the relay availability of the relay UE.

3. The method of claim 1, further comprising:
    sending, for the base station, a measurement report comprising sidelink measurements between the remote UE and the relay UE.

4. The method of claim 3, wherein the measurement report includes an identifier for the relay UE.

5. The method of claim 1, further comprising:
    negotiating with the relay UE over the sidelink for relaying the communication between the remote UE and the base station.

6. The method of claim 1, wherein the remote UE is in an RRC connected mode with the base station.

7. The method of claim 1, wherein the relay UE comprises a mobile UE or a stationary UE.

8. The method of claim 1, wherein transmitting the relay request comprises broadcasting the relay request to multiple UEs including the relay UE.

9. The method of claim 1, further comprising:
    transmitting, for the base station, a message indicating the relay availability of the relay UE or the relay request of the remote UE, wherein the configuration for the relay of the communication from the base station is received based on the message.

10. The method of claim 1, wherein transmitting the relay request comprises transmitting the relay request while in an active sidelink mode.

11. The method of claim 1, further comprising:
    establishing a direct connection with the relay UE based on the relay request.

12. The method of claim 11, further comprising:
performing a mutual authentication procedure with the relay UE prior to establish the direct connection with the relay UE.

13. The method of claim 1, further comprising:
transmitting or receiving user data from the base station through the relay UE based on the configuration.

14. The method of claim 1, wherein the indication of the relay availability is received in a sidelink discovery message.

15. An apparatus for wireless communication at a remote user equipment (UE), comprising:
a memory; and
at least one processor coupled to the memory and, based at least in part on information stored in the memory, the at least one processor is configured to:
transmit, to a relay UE, a relay request via sidelink, the relay UE being in a radio resource control (RRC) inactive mode;
receive, from the relay UE via the sidelink, an indication of relay availability in response to the relay request; and
receive, from a base station, a configuration for relay of communication from the base station over the sidelink between the remote UE and the relay UE.

16. The apparatus of claim 15, wherein the at least one processor is further configured to:
transmit, for the base station, a notification of the relay availability of the relay UE.

17. The apparatus of claim 15, wherein the at least one processor is further configured to:
send, for the base station, a measurement report comprising sidelink measurements between the remote UE and the relay UE.

18. The apparatus of claim 17, wherein the measurement report includes an identifier for the relay UE.

19. The apparatus of claim 15, wherein the at least one processor is further configured to:
negotiate with the relay UE over the sidelink for relaying the communication between the remote UE and the base station.

20. The apparatus of claim 15, wherein the remote UE is in an RRC connected mode with the base station.

21. The apparatus of claim 15, wherein the relay UE comprises a mobile UE or a stationary UE.

22. The apparatus of claim 15, wherein to transmit the relay request, the at least one processor is configured to broadcast the relay request to multiple UEs including the relay UE.

23. The apparatus of claim 15, wherein the at least one processor is further configured to:
transmit, for the base station, a message indicating the relay availability of the relay UE or the relay request of the remote UE, wherein the configuration for the relay of the communication from the base station is received based on the message.

24. The apparatus of claim 15, wherein to transmit the relay request, the at least one processor is configured to transmit the relay request while in an active sidelink mode.

25. The apparatus of claim 15, wherein the at least one processor is further configured to:
establish a direct connection with the relay UE based on the relay request.

26. The apparatus of claim 25, wherein the at least one processor is further configured to:
perform a mutual authentication procedure with the relay UE prior to establish the direct connection with the relay UE.

27. The apparatus of claim 15, wherein the at least one processor is further configured to:
transmit or receive user data from the base station through the relay UE based on the configuration.

28. The apparatus of claim 15, wherein the indication of the relay availability is received in a sidelink discovery message.

29. An apparatus for wireless communication at a remote user equipment (UE), comprising:
means for transmitting, to a relay UE, a relay request via sidelink, the relay UE being in a radio resource control (RRC) inactive mode;
means for receiving, from the relay UE via the sidelink, an indication of relay availability in response to the relay request; and
means for receiving, from a base station, a configuration for relay of communication from the base station over the sidelink between the remote UE and the relay UE.

30. A non-transitory computer-readable medium storing computer executable code at a remote user equipment (UE), the code when executed by a processor causes the processor to:
transmit, to a relay UE, a relay request via sidelink, the relay UE being in a radio resource control (RRC) inactive mode;
receive, from the relay UE via the sidelink, an indication of relay availability in response to the relay request; and
receive, from a base station, a configuration for relay of communication from the base station over the sidelink between the remote UE and the relay UE.

* * * * *